(12) United States Patent
Wu et al.

(10) Patent No.: US 10,369,877 B2
(45) Date of Patent: Aug. 6, 2019

(54) HYBRID DRIVE SYSTEM WITH MULTIPLE DRIVE MACHINES

(71) Applicant: UVic Industry Partnerships Inc., Victoria (CA)

(72) Inventors: Guang Wu, Victoria (CA); Zuomin Dong, Victoria (CA)

(73) Assignee: UVic Industry Partnerships Inc., Victoria (CA)

(*) Notice: Subject to any disclaimer, the term of this patent is extended or adjusted under 35 U.S.C. 154(b) by 849 days.

(21) Appl. No.: 14/711,071

(22) Filed: May 13, 2015

(65) Prior Publication Data

US 2015/0328976 A1 Nov. 19, 2015

Related U.S. Application Data

(60) Provisional application No. 61/992,853, filed on May 13, 2014.

(51) Int. Cl.
| | |
|---|---|
| *B60K 6/442* | (2007.10) |
| *B60K 6/54* | (2007.10) |
| *F16H 3/087* | (2006.01) |
| *F16H 3/093* | (2006.01) |
| B60K 6/48 | (2007.10) |
| F16H 3/08 | (2006.01) |

(52) U.S. Cl.
CPC .............. *B60K 6/442* (2013.01); *B60K 6/54* (2013.01); *F16H 3/087* (2013.01); *F16H 3/093* (2013.01); *B60K 2006/4825* (2013.01); *B60K 2006/541* (2013.01); *F16H 2003/0803* (2013.01); *F16H 2200/006* (2013.01); *F16H 2200/0052* (2013.01); *Y10S 903/909* (2013.01); *Y10T 74/19014* (2015.01)

(58) Field of Classification Search
CPC .... B60K 6/442; B60K 6/54; B60K 2006/541; B60K 2006/4825; F16H 3/087; F16H 3/093; F16H 2003/0803
USPC .......................................................... 74/661
See application file for complete search history.

(56) References Cited

U.S. PATENT DOCUMENTS

| | | | |
|---|---|---|---|
| 7,028,796 B2 | 4/2006 | Kim | |
| 7,213,666 B2 | 5/2007 | Saito et al. | |
| 7,845,444 B2 | 12/2010 | Kidokoro et al. | |
| 2010/0311540 A1 | 12/2010 | Hellenbroich | |
| 2013/0186233 A1* | 7/2013 | Kaltenbach | B60K 6/442 74/661 |

(Continued)

FOREIGN PATENT DOCUMENTS

| | | | |
|---|---|---|---|
| EP | 1232890 | | 8/2002 |
| EP | 1232891 | | 8/2002 |
| WO | WO 2012/000705 | * | 1/2012 |

*Primary Examiner* — William C Joyce
(74) *Attorney, Agent, or Firm* — Klarquist Sparkman, LLP

(57) ABSTRACT

A hybrid drive system includes a transmission having first and second parallel input shafts. The first and second parallel input shafts are selectively coupled together via a plurality of gearwheels operable to vary the rotational speed of the second parallel shaft relative to the first parallel shaft. The hybrid drive system includes at least one irreversible drive machine coupled to the transmission and operable to provide torque to at least one of the first or second parallel input shafts, and at least one reversible drive machine coupled to the transmission and operable to provide torque to at least one of the first or second parallel input shafts.

20 Claims, 31 Drawing Sheets

(56) References Cited

U.S. PATENT DOCUMENTS

2013/0345008 A1  12/2013  Torrelli

\* cited by examiner

HYBRID DRIVE SYSTEM WITH MULTIPLE DRIVE MACHINES

CROSS-REFERENCE TO RELATED APPLICATIONS

This application claims the benefit of U.S. Provisional Application No. 61/992,853, filed May 13, 2014, which is incorporated herein by reference in its entirety.

FIELD

This disclosure relates to hybrid drive systems for transmitting energy from multiple drive machines such internal combustion engines and electric motors to propel vehicles.

BACKGROUND

Hybrid drive systems draw power from multiple drive machines to improve the energy efficiency and performance of various vehicles. A major challenge facing the developers of this technology is how to effectively combine the speed and torque contributions of different drive machines to deliver different desired modes of operation to gain energy efficiency, performance improvement, size reductions, and cost savings under various operational and utility constraints. One type of transmission that is especially suited for use in hybrid drive systems with two motors is the automated manual transmission (AMT). The AMT can be low cost, high capacity, high efficiency, and does not require a torque convertor. However, the AMT requires a torque interruption when shifting gears, which can be uncomfortable, and which has inhibited its application in passenger vehicles. Accordingly, improvements to hybrid drive systems are desirable.

SUMMARY

U.S. Pat. No. 7,213,666 discloses a hybrid vehicle with a first motor mounted between a clutch and an internal combustion engine, and a second motor connected to a driving wheel with a fixed ratio. U.S. Pat. No. 7,028,796 discloses a four-wheel hybrid drive apparatus with an engine-generator set driving the front wheels via a transmission, and another motor driving the rear wheels via a clutch. U.S. Pat. No. 7,845,444 also discloses a hybrid vehicle that is similar to U.S. Pat. No. 7,213,666, while the conventional transmission is replaced by a fixed-gear transmission since the two electric motors allow hybrid vehicle to run in either electric vehicle (EV) mode or series hybrid mode. However, there exist some common drawbacks. For example, two motors cannot be used to propel a vehicle simultaneously in EV mode without a rotating engine because one electric motor is fixedly coupled with the engine; the primary driving motor is often connected to a final drive shaft with a fixed gear ratio, rather than a shiftable transmission.

Some transmission suppliers and original equipment manufacturers (OEMs) have found different approaches to fill the torque gap by taking advantage of vehicle hybridization. For example, U.S. Patent Publication No. 2010/0311540 discloses a hybrid drive system with an AMT including two merged sub-transmissions. U.S. Patent Publication No. 2013/0345008 discloses a system that includes one AMT with two sub-transmissions for an engine and an electric motor, separately. European Patent Nos. E.P. 1,232,890 and E.P. 1,232,891 illustrate two hybrid AMTs including one separate sub-transmission for electric motor and merging the sub-transmission into a main transmission, respectively. However, these hybrid drive systems require complex gearbox structure changes from a conventional manual gearbox. Additionally, the disclosed embodiments include only one motor, and the disclosed gear ratios follow the format of a conventional transmission. Furthermore, the aforementioned disclosures do not eliminate the torque gap when shifting gears in EV mode.

Disclosed embodiments of the present application provide hybrid drive systems that address certain deficiencies of known hybrid drive systems and meet special needs of various vehicle sectors, like luxury vehicles, trucks and compact vehicles. In one representative embodiment, a hybrid drive system comprises a transmission including first and second parallel input shafts, the first and second parallel input shafts being selectively coupled together via a plurality of gearwheels operable to vary the rotational speed of the second parallel shaft relative to the first parallel shaft. The hybrid drive system further comprises at least one irreversible drive machine coupled to the transmission and operable to provide torque to at least one of the first or second parallel input shafts, and at least one reversible drive machine coupled to the transmission and operable to provide torque to at least one of the first or second parallel input shafts.

In another representative embodiment, a hybrid drive system for a vehicle comprises a parallel shaft transmission having at least one main input shaft connected to an output shaft and a secondary input shaft. The output shaft and the secondary input shaft are coaxial, the main input shaft and the output shaft are coupled by a plurality of shiftable gearwheel pairs and a shiftable compound gearwheel. The compound gearwheel is idly mounted on the main input shaft and constantly engaged with a gearwheel on the secondary input shaft and a shiftable gearwheel idly mounted on the output shaft. The hybrid drive system further comprises at least one irreversible drive machine coupled to the parallel shaft transmission by a clutch, and a first reversible drive machine coupled to the secondary input shaft. The secondary input shaft is selectively couplable to the main input shaft and selectively couplable to the output shaft. The hybrid drive system further comprises a second reversible drive machine coupled to the main input shaft, and an energy storage system electrically connected with the first reversible drive machine.

In another representative embodiment, a method of operating a hybrid drive system comprises transmitting torque provided by an irreversible drive machine to an output shaft, transmitting torque provided by a first reversible drive machine to the output shaft, and decreasing the torque provided to the output shaft by the irreversible drive machine. The method further comprises increasing the torque provided to the output shaft by the first reversible drive machine, changing a gear ratio by which the irreversible drive machine transmits torque to the output shaft, and increasing the torque provided to the output shaft by the irreversible drive machine, wherein the total torque provided to the output shaft before, during, and after changing of the gear ratio is substantially constant.

It is an object of this disclosure to provide a flexible, high-efficiency, low-cost and compact hybrid drive system that incorporates a novel AMT and supports smooth gearshifts for Parallel Hybrid mode and EV mode.

It is an object of the this disclosure to provide a hybrid drive system that can work in Series Hybrid mode, Parallel Hybrid Mode and EV mode, for both longitudinal and transversal engine layout.

It is an object of this disclosure to provide a hybrid drive system with two electric motors that transmit torque to wheels using different gear ratios, rather than a fixed gear ratio.

It is an object of this disclosure to provide a transmission capable of minimizing installation space.

It is an object of this disclosure to provide a hybrid drive system with two electric motors that can propel a vehicle and recapture kinematic energy during deceleration without rotating an engine crankshaft in order to minimize energy consumption.

It is an object of this disclosure to provide a hybrid drive system that can realize smaller gear ratio steps with simpler mechanical construction to further enhance efficiency.

It is an object of this disclosure to incorporate an automated manual transmission due to its advantages in costs, capacity, efficiency and absence of torque convertor.

It is an object of this disclosure to reduce torque interruption during gearshifts in different operation modes through innovative design of transmission and operation method.

It is an object of this disclosure to provide a hybrid drive system that can transition among different operational modes smoothly through coordinated control of drive machines and transmission with clutch.

The foregoing and other objects, features, and advantages of the disclosure will become more apparent from the following detailed description, which proceeds with reference to the accompanying figures.

BRIEF DESCRIPTION OF THE DRAWINGS

The following figures set forth the different aspects and embodiments, and serve to explain the principles and operation of the disclosed embodiments.

DETAILED DESCRIPTION

Figure 1:
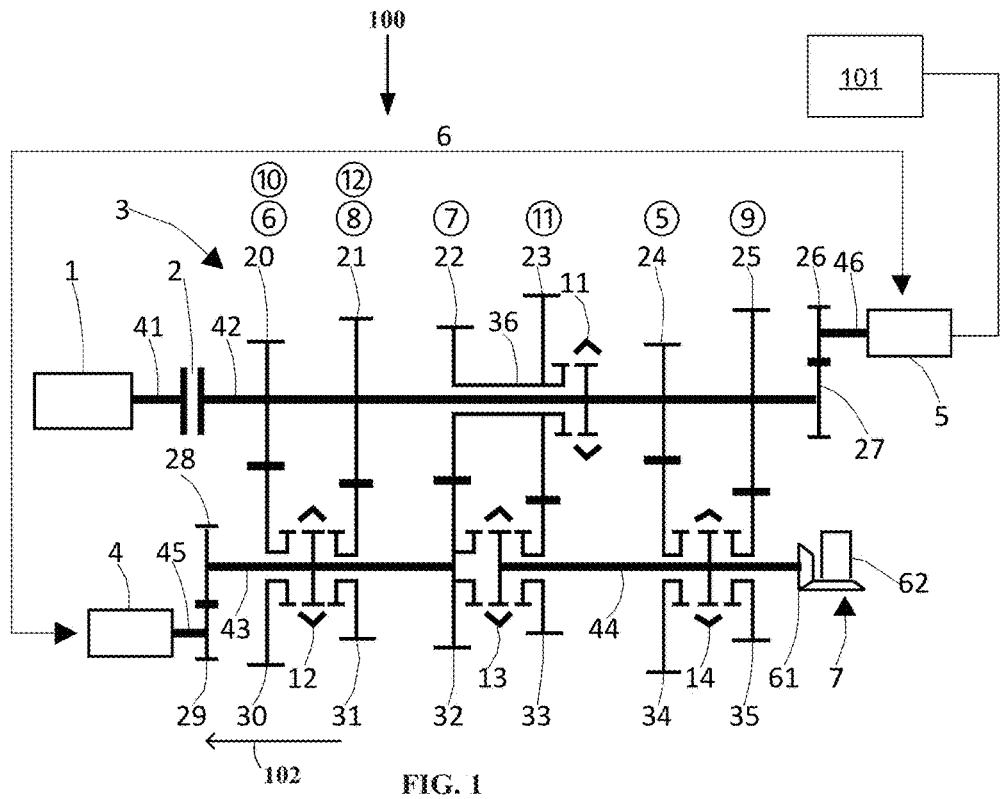
FIG. 1 shows a schematic diagram of a representative embodiment of a hybrid drive system.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

In some examples, values, procedures, or apparatus' are referred to as "lowest," "best," "minimum," or the like. It will be appreciated that such descriptions are intended to indicate that a selection among many used functional alternatives can be made, and such selections need not be better, smaller, or otherwise preferable to other selections.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

Although the disclosed embodiments pertain primarily to automobiles, the embodiments described herein are also applicable to watercraft, aircraft, etc., or any other suitable self-propelled craft, collectively referred to herein as "vehicles."

As used herein, the term "hybrid drive system" refers to a system including a transmission, two or more drive machines, and associated clutches, gears, and shafts for propelling a vehicle. As used herein, the term "drive machine" refers to a machine that converts chemical or electrical energy to mechanical energy that can be used to propel a vehicle. Examples of suitable drive machines include internal combustion engines and electric motors. As described herein, drive machines can be reversible or irreversible. As used herein, a reversible drive machine is a drive machine capable of reversing the direction of energy conversion. Examples of reversible drive machines include electric motors and hydraulic motors. As used herein, an irreversible drive machine is a drive machine that cannot reverse the direction of energy conversion. Examples of irreversible drive machines include internal combustion engines. Some drive machines, such as electric motors, can also convert mechanical energy to electrical energy, as desired.

Hybrid drive systems can include two or more drive machines, such as three drive machines, and can work in different operational modes. Generally, at least one of the drive machines in a hybrid vehicle is an electric motor. Compared to a conventional vehicle powered exclusively by an internal combustion engine or a traditional hybrid vehicle with two drive machines (e.g., an internal combustion engine and an electric motor), the following embodiments can allow a hybrid vehicle to operate in a series hybrid mode, a parallel hybrid mode, or an electric vehicle (EV) mode.

As used herein, the term "series hybrid mode" refers to an operational mode of a hybrid drive system including at least one internal combustion engine and at least one electric motor, wherein the internal combustion engine can be used to turn a generator to supply electricity to the electric motor, which propels the vehicle. This can allow the internal combustion engine to operate at a constant or nearly constant rotational speed and load associated with its peak fuel efficiency. A hybrid drive system operating in series hybrid mode can also include one or more batteries for storing electrical energy produced by the internal combustion engine and generator when the energy is not required for propelling the vehicle.

As used herein, the term "parallel hybrid mode" refers to an operational mode of a hybrid drive system including at least one internal combustion engine and at least one electric motor, wherein the internal combustion engine and the electric motor are mechanically coupled to a common shaft such that the internal combustion engine and the electric motor rotate at rotational speeds that are proportional to one another, and the respective mechanical torques imparted to the common shaft by the internal combustion engine and the electric motor are additive.

As used herein, the term "electric vehicle mode" (EV mode) refers to an operational mode of a hybrid drive system in a vehicle including at least one electric motor, wherein only the electric motor propels the vehicle. The electrical energy can be supplied by one or more batteries, or provided by another source such as an internal combustion engine and generator. Operating in EV mode can reduce petroleum consumption by substituting fossil fuel with electric energy.

The various hybrid drive systems and operational modes described herein can save fuel and reduce emissions by virtue of functions like frequent stop-start operation, engine boosting, and energy regeneration, such as by regenerative braking.

Referring to the figures generally, the components of the various embodiments disclosed herein are given common reference numbers for ease of illustration. However, it should be understood that the commonly referenced components of the various embodiments need not be of the same type or size, and need not be in the same location or operate in the same manner from one embodiment to the next. Components of the hybrid drive systems disclosed herein can include a parallel shaft transmission, an irreversible drive machine, and at least one reversible drive machine. The output shafts of the drive machines can be selectively coupled together by the parallel shaft transmission, which can include at least one main input shaft, one secondary input shaft, one output shaft, at least one clutch (dry or wet), as well as a plurality of gearwheel pairs. In some embodiments, the parallel shaft transmission can be an automated manual transmission with one main input shaft and a single clutch, or a dual-clutch transmission with two main input shafts and two clutches. In some embodiments, the irreversible drive machine can be replaced by a reversible drive machine, such as an electric motor. In some embodiments, one or more of the reversible drive machines can be hydraulic motors. The hybrid drive systems disclosed herein can be applicable to hybrid electric vehicles (HEVs), plug-in hybrid electric vehicles (PHEVs), fuel cell hybrid electric vehicles (FCHEVs) and pure electric vehicles (EVs), as well as other applications with blended drives.

FIG. 1 illustrates a hybrid drive system 100 including an irreversible drive machine such as an internal combustion engine 1, a main clutch 2, an automated manual transmission 3, two electric motors 4 and 5, a final drive 7, and an energy storage system 101, which can be a rechargeable battery. In the embodiment shown, the electric motors 4, 5 can cooperate to operate as a continuously variable transmission (CVT) 6. In the embodiment shown, the energy storage system 101 can be configured as a battery and can be electrically connected with the electric motor 5. However, the energy storage system 101 can be electrically connected with the electric motor 4, the electric motor 5, or both, as desired.

A main input shaft 42 can be connected to internal combustion engine 1 via the main clutch 2 (which can be dry, wet, or electromagnetic) and to the electric motor 5 via a pair of gearwheels 26 and 27, or other suitable coupling device. The hybrid drive system can include an output shaft 44 parallel to the main input shaft 42. The output shaft 44 can be coupled to the final drive 7 and to the main input shaft 42 via any of a plurality of shiftable gearwheel sets or pairs, namely gearwheels 23 and 33, gearwheels 24 and 34, and gearwheels 25 and 35. As used herein, a "shiftable gearwheel" refers to a gearwheel that is selectively engageable and disengageable from a shaft or another gearwheel by a coupling device such as, for example, a dog clutch. A secondary input shaft 43 can be coupled to the electric motor 4 via gearwheels 29 and 28, or another suitable coupling device, and can be coaxial with the output shaft 44.

In some embodiments, the secondary input shaft 43 can be a semi-independent shaft, and can be selectively coupled to the output shaft 44 by engaging a coupling device 13 (e.g., a dog clutch), in the direction indicated by arrow 102. The secondary input shaft 43 can also be coupled to the output shaft 44 via a compound gearwheel 36 idly mounted on the main input shaft 42 by engaging coupling 13 on the right side. Alternatively, the secondary input shaft 43 can be connected to the main input shaft 42 via a plurality of shiftable gearwheel pairs or sets such as gearwheels 20 and 30, gearwheels 21 and 31, or gearwheels 22 and 32. As shown in FIG. 1, the compound gearwheel 36 can be near the center of the main input shaft 42.

The embodiment shown includes six pairs of gearwheels mounted to the main input shaft 42. In the disclosed embodiments, the gearwheels can be mounted to a shaft such that the gearwheels are rotationally locked with the shaft. In other words, the gearwheels can be mounted such that rotation of the shaft causes corresponding rotation of the gearwheels along with the shaft. Exemplary ways of mounting a gearwheel such that it is rotationally locked with a shaft include fixedly mounting the gearwheel to the shaft, or using any of various keyed couplings, such as splines. Alternatively, gearwheels can be idly mounted to the shaft such that the gearwheels rotate when engaged by, for example, a coupling device or another gearwheel rotationally locked with a rotating shaft (which may be the same or different from the shaft to which the idly-mounted gearwheel is mounted). In the embodiment illustrated in FIG. 1, gearwheels 20, 21, 24, and 27, along with coupling device 11, are rotationally locked with the main input shaft 42, while the gearwheels 22 and 23 of compound gearwheel 36 are idly mounted to the shaft 42. Gearwheel 32 and coupling device 12 are rotationally locked with the secondary input shaft 43, while gearwheels 30 and 31 are idly mounted to the shaft 43. Gearwheels 33, 34, and 35 are idly mounted to the output shaft 44, while the coupling device 14 is rotationally locked with the shaft 44.

By engaging or disengaging the main clutch 2 and coupling devices within the automated manual transmission 3, the hybrid drive system 100 can operate in a series hybrid mode, a parallel hybrid mode, or an electric vehicle (EV) mode with electric motors 4 and 5 to achieve flexible operation and reduction of fuel consumption.

In series hybrid mode, the internal combustion engine 1 can drive the electric motor 5 at an optimal operational speed (e.g., at a rotational speed associated with peak fuel efficiency of the internal combustion engine 1) such that the electric motor 5 operates as an electric generator. The main input shaft 42 can be disconnected from both the secondary input shaft 43 and the output shaft 44 such that the electric motor 5 produces electrical energy for electric motor 4, which can provide torque to the final drive 7. Thus, the internal combustion engine 1 can be isolated from the final drive 7 by the two motors 4 and 5 such that the internal combustion engine 1 and the final drive 7 can rotate independently at different rotational speeds. In this manner, the electric motors 4 and 5 can cooperate to form the electric continuously variable transmission (e-CVT) 6. The e-CVT 6 can cover the range of low to medium speed, depending on the size of the two motors 4 and 5 and control strategies.

In parallel hybrid mode, the internal combustion engine 1, together with the two electric motors 4 and 5, can deliver torque to the final drive 7 via the automated manual transmission 3. In the embodiment shown, the automated manual transmission 3 can operate with gear ratios corresponding to from fifth gear to twelfth gear of a stepped transmission (i.e., from medium to high speed). When a gear change is required, the internal combustion engine 1 can be selectively decoupled from the output shaft 44 by either disengaging a currently engaged gearwheel and/or by disengaging the main clutch 2. Meanwhile, torque output from electric motor 4 can be increased to make up for the reduced torque output from the internal combustion engine 1. Thus, at least one torque path from the various drive machines to the final drive 7 is maintained during the gear change. During the gear-shifting process, the electric motor 5 can actively regulate rotational speed of the internal combustion engine 1 and decrease the time required for speed synchronization. In addition, the electric motor 4 can provide torque to the output shaft 44 via two principle gear ratios and additional accessory gear ratios, as necessary. When a gear change for electric motor 4 is needed, torque output from the internal combustion engine 1 and the electric motor 5 can be routed to the output shaft 44 without interruption.

Figure 2:
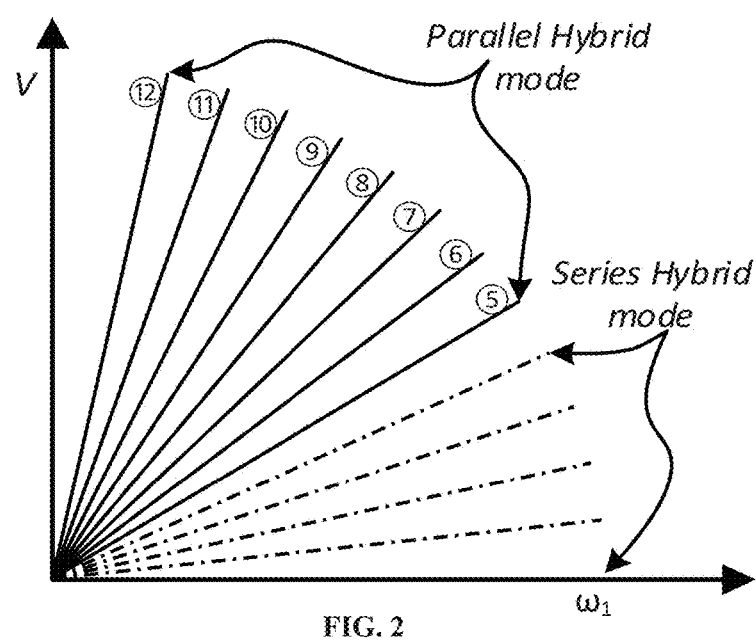
FIG. 2 shows a combination of continuous gear ratios in Series Hybrid mode and discrete gear ratios from Parallel Hybrid mode.

FIG. 2 schematically illustrates the relationship between the rotational speed of the internal combustion engine 1 ($\omega_1$) and the vehicle speed (V) in series hybrid mode and parallel hybrid mode for the hybrid drive system 100. When operating in the series hybrid mode, the e-CVT 6 can provide a range of continuous gear ratios corresponding to the first several stepped gear ratios of a traditional transmission (the four discrete gear ratios represented by dashed lines in FIG. 2) for up to medium vehicle speed. As the vehicle speed increases, the parallel hybrid mode can be activated, providing stepped gear ratios for the internal combustion engine 1.

As shown in FIG. 2, the hybrid drive system 100 can provide for eight discrete gear ratios when operating in parallel hybrid mode. With respect to conventional stepped transmissions and CVTs, the hybrid drive system 100 offers a combination of continuous gear ratios for low to medium speed (series hybrid mode), and eight stepped gear ratios for medium to high speed (parallel hybrid mode). In some embodiments, the series and parallel hybrid modes can have overlapping ranges of operation. In some embodiments, one or more stepped gear ratios can also be set aside for vehicle launch and low-speed running in case of motor failure.

Figure 3:
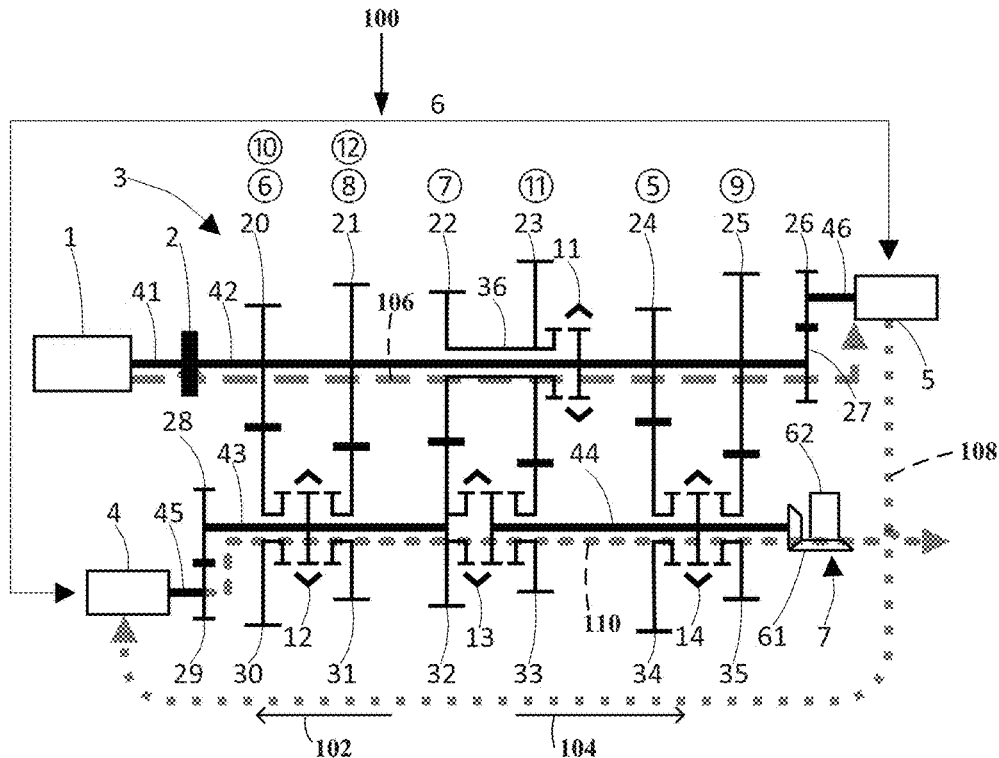
FIG. 3 schematically illustrates a torque flow path through the hybrid drive system of FIG. 1 when operating in Series Hybrid mode.

FIG. 3 illustrates the torque flow path through the hybrid drive system 100 when operating in series hybrid mode. In series hybrid mode, the main input shaft 42 can be coupled to the internal combustion engine 1 via the main clutch 2, which is shown in the closed or engaged position. The main input shaft 42 can be mechanically decoupled from the secondary input shaft 43 and the output shaft 44 by disengaging coupling devices 11, 12 and 14 such that the main input shaft 42 rotates independently of the secondary input shaft 43 and the output shaft 44. The secondary input shaft 43 can be mechanically coupled to the output shaft 44 by moving coupling device 13 in the direction indicated by arrow 102 such that the coupling device 13 engages the output shaft 44. Alternatively, the main input shaft 42 can be mechanically coupled to the output shaft 44 via compound gear wheel 36 by moving coupling device 13 in the direction indicated by arrow 104 such that the coupling device 13 engages the compound gear wheel 36. As a result, the internal combustion engine 1 can provide torque to the electric motor 5, as indicated by arrow 106, which can allow the electric motor 5 to generate electrical energy. The electrical energy generated by electric motor 5 can be supplied to electric motor 4, as indicated by arrow 108. The electric motor 4 can use the electrical energy to apply torque to output shaft 44, which can be transmitted along output shaft 44 as indicated by arrow 110 to propel the vehicle.

In the embodiment shown, the internal combustion engine 1 is not mechanically linked to the output shaft 44 directly, so the internal combustion engine 1 and the electric motor 5 can operate at the speed and torque output associated with peak efficiency for the engine-electric motor combination independent of the rotational speed of the output shaft 44. Thus, the two electric motors 4, 5 can function together as the e-CVT 6, with the shaft 46 acting as an input shaft and the shaft 45 acting as an output shaft. The e-CVT 6 can be advantageous in city driving, which typically involves low average speed and frequent starts and stops. In alternative embodiments, the available range of continuous gear ratios can be expanded or reduced according to the size of the electric motors 4, 5, as desired.

FIGS. 4-12 illustrate various torque pathways through the hybrid drive system 100 when operating in the parallel hybrid mode. In parallel hybrid mode, the internal combustion engine 1 can be connected to the main input shaft 42 and the electric motor 5 via closed main clutch 2. The main input shaft 42 can transmit torque to the output shaft 44 via at least one of gearwheel pairs 20 and 30, 21 and 31, 22 and 32, 23 and 33, 24 and 34, and 25 and 35. The electric motor 4 can provide torque to the output shaft 44 via the coupling device 13 by moving the coupling device 13 to engage either the secondary input shaft 43 or the compound gearwheel 36. In some embodiments, there can be at least one drive machine that delivers torque to the output shaft 44 to avoid torque interruption when shifting gears. Through coordinated usage of the four coupling devices 11, 12, 13 and 14, eight (8) stepped gear ratios for the internal combustion engine 1 can be provided based on six gearwheel pairs mounted to the respective shafts 42, 43, and 44.

Figure 4:
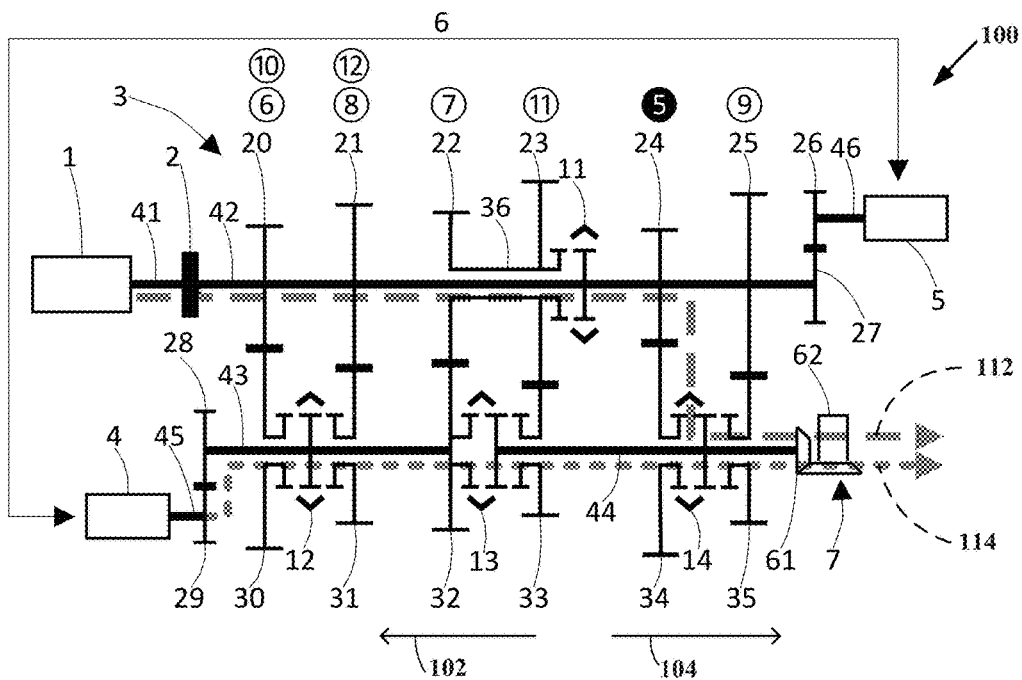
FIG. 4 schematically illustrates a torque flow path through the hybrid drive system of FIG. 1 when operating in fifth gear in Parallel Hybrid mode.

FIG. 4 shows the torque flow path through the hybrid drive system 100 when operating in fifth gear (the first stepped gear). Internal combustion engine 1 can be coupled, via the main clutch 2, with the main input shaft 42. The main input shaft 42 and the output shaft 44 can be mechanically coupled via gearwheels 24 and 34, mounted to the main input shaft 42 and the output shaft 44, respectively. This can be accomplished by moving the coupling device 14 in the direction indicated by arrow 102 such that it engages the gearwheel 34. In this manner, torque supplied by the internal combustion engine 1 can be transmitted along the main input shaft 42, and transferred to the output shaft 44 by gearwheels 24 and 34 in combination with the coupling device 14, as indicated by arrow 112. Electric motor 5 can be coupled to the output shaft 44 via gearwheels 24 and 34 as well. Meanwhile, the electric motor 4 can be coupled to the output shaft 44 by the coupling device 13, which can couple the second input shaft 43 to the output shaft 44. In this manner, torque supplied by the electric motor 4 can be transmitted along the second input shaft 43 and transferred to the output shaft 44 by the coupling device 13, as indicated by arrow 114. When a gear change is needed for the internal combustion engine 1, the main clutch 2 can be disengaged and the coupling device 14 can be moved in the direction indicated by arrow 104 to a central position wherein the coupling device 14 is not engaged with either the gearwheel 34 or the gearwheel 35.

Figure 5:
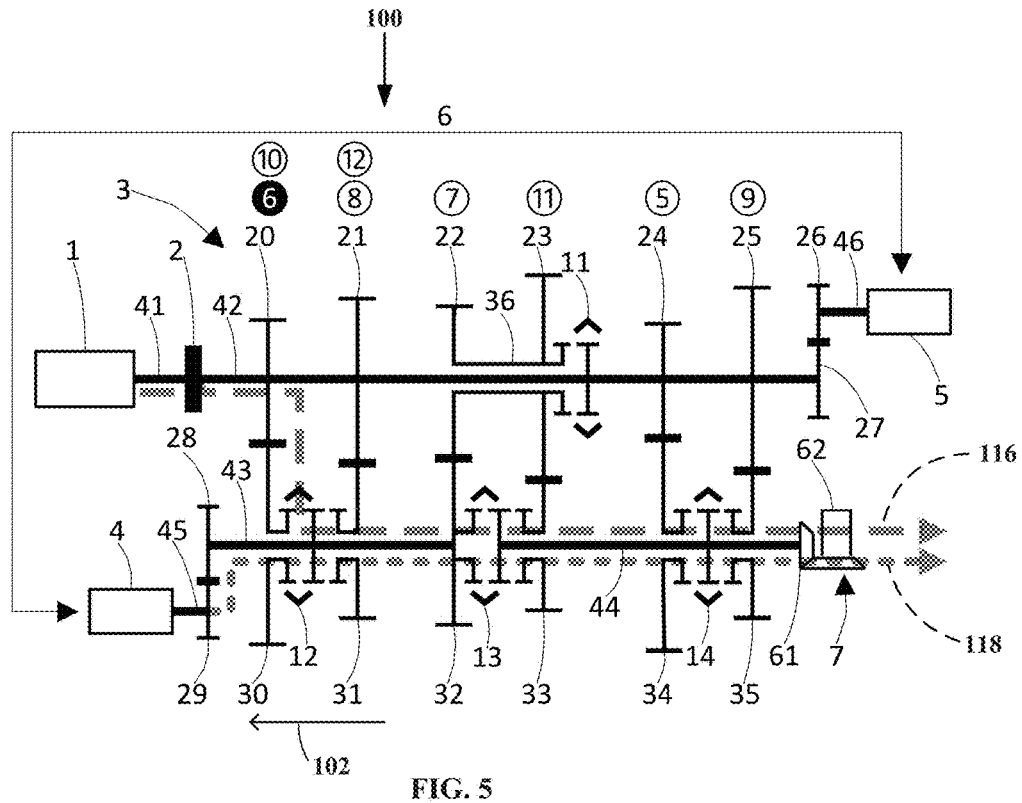
FIG. 5 shows a schematic diagram and energy flow path through the hybrid drive system of FIG. 1 when operating in sixth gear in Parallel Hybrid mode.

FIG. 5 shows the torque flow path through the hybrid drive system 100 when operating in sixth gear (the second stepped gear). Shifting from fifth to sixth gear can occur in three stages, during which the torque supplied to the output shaft 44 remains relatively stable. First, torque from the internal combustion engine 1 is reduced, while torque from the electric motor 4 is added (i.e., a first torque shift), such that the total torque transferred to the output shaft 44 remains relatively unchanged. Second, the main clutch 2 can be disengaged such that the internal combustion engine 1 and the main input shaft 42 are uncoupled, and the coupling device 14 can be moved to the central position such that it is engaged with neither the gearwheel 34 nor the gearwheel 35. The rotational speed of electric motor 5 can be controlled to synchronize the rotational speed of the gearwheel 30 and the secondary input shaft 43 (i.e., speed synchronization). Once the rotational speed of the secondary input shaft 43 matches the rotational speed of gearwheel 30, the coupling device 12 can be moved in the direction indicated by arrow 102 to engage the gear wheel 30. The main clutch 2 can also reengage the internal combustion engine 1 such that the internal combustion engine 1 is coupled to the main input shaft 42.

Upon completion of the gear change, the torque supplied by the internal combustion engine 1 can be increased and the torque supplied by the electric motor 4 can be decreased (i.e., a second torque shift). Through the coordinated operation of the internal combustion engine 1, the electric motors 4, 5, the main clutch 2, and the coupling devices 12 and 14, stable torque can be supplied to the output shaft 44 during the gear change. In sixth gear, torque provided by the internal combustion engine 1 can be transmitted to the output shaft 44 via gearwheels 20 and 30, and the two coupling devices 12 & 13, as indicated by arrow 116. The torque provided by the electric motor 4 can be transmitted along the secondary input shaft 43 to the output shaft 44 via the coupling device 13, as indicated by arrow 118.

Figure 6:
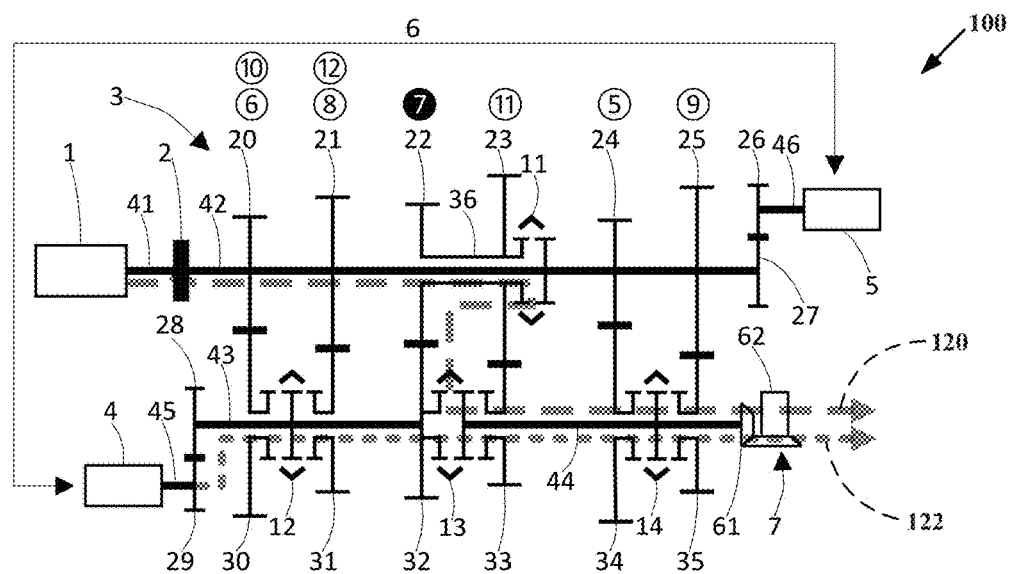
FIG. 6 schematically illustrates a torque flow path through the hybrid drive system of FIG. 1 when operating in seventh gear in Parallel Hybrid mode.

FIG. 6 shows the torque flow path through the hybrid drive system 100 when operating in seventh gear (the third stepped gear). When shifting to seventh gear from sixth gear, the torque supplied to the main input shaft 42 by the internal combustion engine 1 is reduced. Meanwhile, the torque supplied to the output shaft 44 by the electric motor 4 is increased such that the total torque transmitted to the output shaft 44 is unchanged. The main clutch 2 can then be disengaged from the internal combustion engine 1, and the coupling device 12 can be moved to a neutral position, such that only the electric motor 4 transmits torque to the output shaft 44. The electric motor 5 can actively synchronize the rotational speed of the compound gear wheel 36 with the rotational speed of the main input shaft 42, and then the coupling device 11 can engage gear 23 of the compound gear wheel 36. At this point, the torque supplied by the internal combustion engine 1 is quickly increased and the torque supplied by the electric motor 4 correspondingly reduced. Through the coordinated operation of the internal combustion engine 1, electric motors 4 and 5, the main clutch 2, and the coupling devices 11 and 13, constant torque can be supplied to the output shaft 44 during the gear change. After seventh gear is engaged and main clutch 2 is locked, torque supplied by the internal combustion engine 1 is transmitted to the output shaft 44 via main clutch 2, the coupling devices 11, 12 and 13, and the compound gearwheel 36, as shown by arrow 120. Similarly, the torque provided by the electric motor 4 can be transmitted along the secondary input shaft 43 to the output shaft 44 via the coupling device 13, as indicated by arrow 122.

Figure 7:
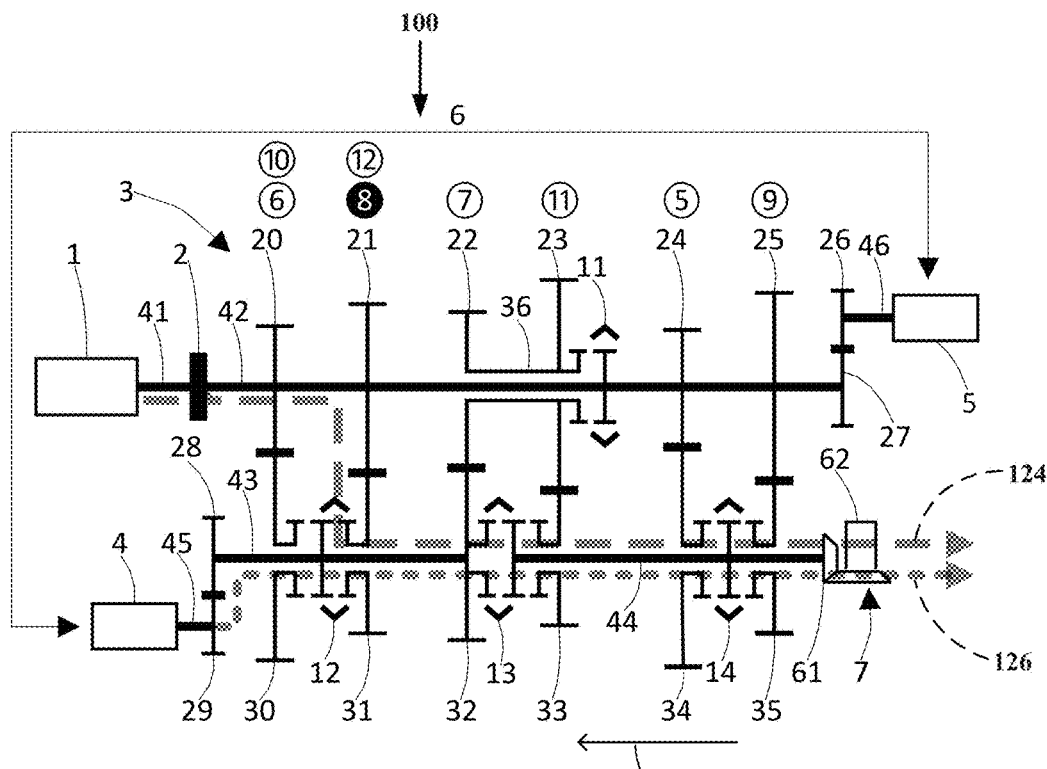
FIG. 7 schematically illustrates a torque flow path through the hybrid drive system of FIG. 1 when operating in eighth gear in Parallel Hybrid mode.

FIG. 7 shows the torque flow path through the hybrid drive system 100 in eighth gear (the fourth stepped gear) after shifting from seventh gear. When shifting to eighth gear from seventh gear, the torque supplied by the internal combustion engine 1 is reduced and the electric motor 4 propels the vehicle substantially by itself (i.e., a first torque shift). The main clutch 2 can then be disengaged from the internal combustion engine 1 and the coupling device 11 can be moved to the neutral position. The electric motor 5 can synchronize the rotational speed of the main input shaft 42 with the rotational speed of the secondary input shaft 43 via the gearwheel 31 (i.e., speed synchronization).

Next, the coupling device 12 can engage gearwheel 31, and the main clutch 2 can engage the internal combustion engine 1. In this manner, torque provided by the internal combustion engine 1 can be transmitted to the output shaft 44 in the manner indicated by arrow 124, while torque provided by the electric motor 4 can be transmitted to the output shaft 44 in the manner indicated by arrow 126. Through coordinated operation of engine 1, electric motors 4 and 5, the main clutch 2, and the coupling devices 11, 12 and 13, stable torque can be supplied to the output shaft 44 during the gear change. In the embodiment shown, operation of the hybrid drive system 100 in eighth gear can be effected primarily by torque transfer from the main input shaft 42 to the secondary input shaft 43 by gearwheels 21 and 31, and from the secondary input shaft 43 to the output shaft 44 by coupling device 13. The coupling device 12 can transmit torque from the main input shaft 42 to the secondary input shaft 43, and the secondary input shaft 43 can transfer the torque to the output shaft 44 by engaging the coupling device 13 with the secondary input shaft 43 in the direction indicated by arrow 102.

Figure 8:
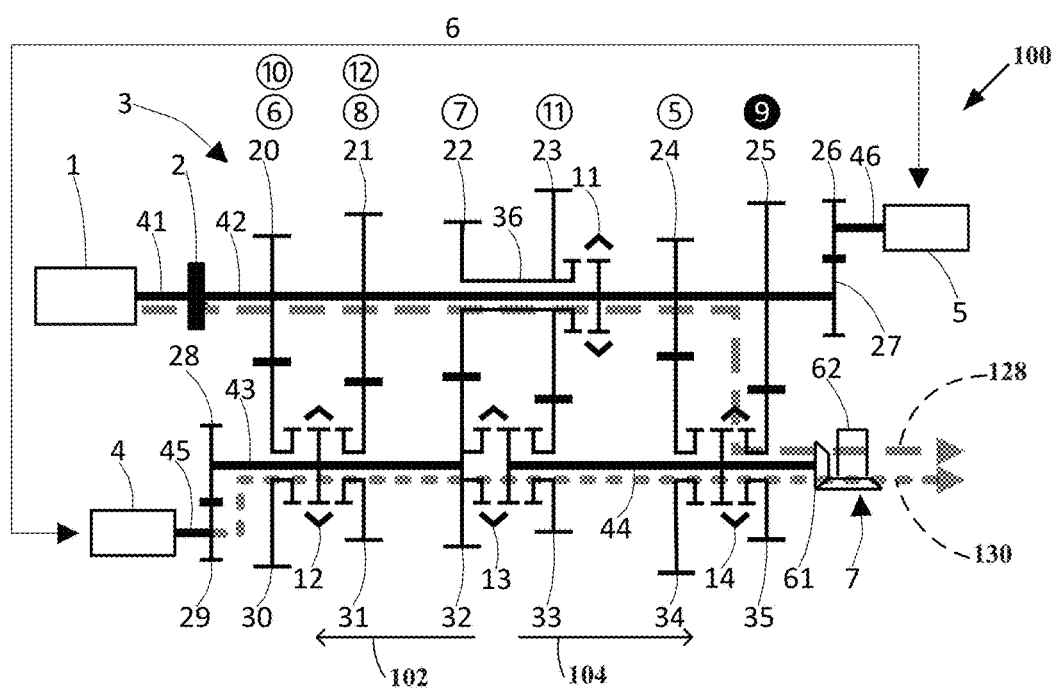
FIG. 8 schematically illustrates a torque flow path through the hybrid drive system of FIG. 1 when operating in ninth gear in Parallel Hybrid mode.

FIG. 8 shows the torque flow path through the hybrid drive system 100 in ninth gear (the fifth stepped gear). When shifting from eighth gear to ninth gear, the torque output from the internal combustion engine 1 can be reduced, the main clutch 2 can be disengaged, and the coupling device 12 can be moved into the neutral position. During this period, the electric motor 4 can provide the required torque to propel the vehicle (i.e., a first torque shift). The electric motor 5 can synchronize the rotational speed of the gearwheel 35 with the rotational speed of the output shaft 44, and a new gear ratio can be provided by moving coupling device 14 in the direction of arrow 104 to engage the gearwheel 35 and re-engaging main clutch 2 with the internal combustion engine 1. The torque supplied by the internal combustion engine 1 can then be increased while the torque provided by the electric motor 4 can be reduced (i.e., a second torque shift). The torque provided by the internal combustion engine 1 can be transmitted to the output shaft 44 via the coupling device 14 in the direction indicated by arrow 128. The torque provided by the electric motor 4 can be transmitted to the output shaft 44, as indicated by arrow 130, by moving the coupling device 13 in the direction indicated by arrow 102 such that the coupling device engages the secondary input shaft 43. Through coordinated operation of the internal combustion engine 1, the electric motors 4 and 5, the main clutch 2, and the coupling devices 12, 13 and 14, stable torque can be supplied to the output shaft 44 during the gear change. When operating in ninth gear, torque provided by the internal combustion engine 1 is transmitted to the output shaft 44 via the gear ratio provided by gearwheels 25 and 35.

Figure 9:
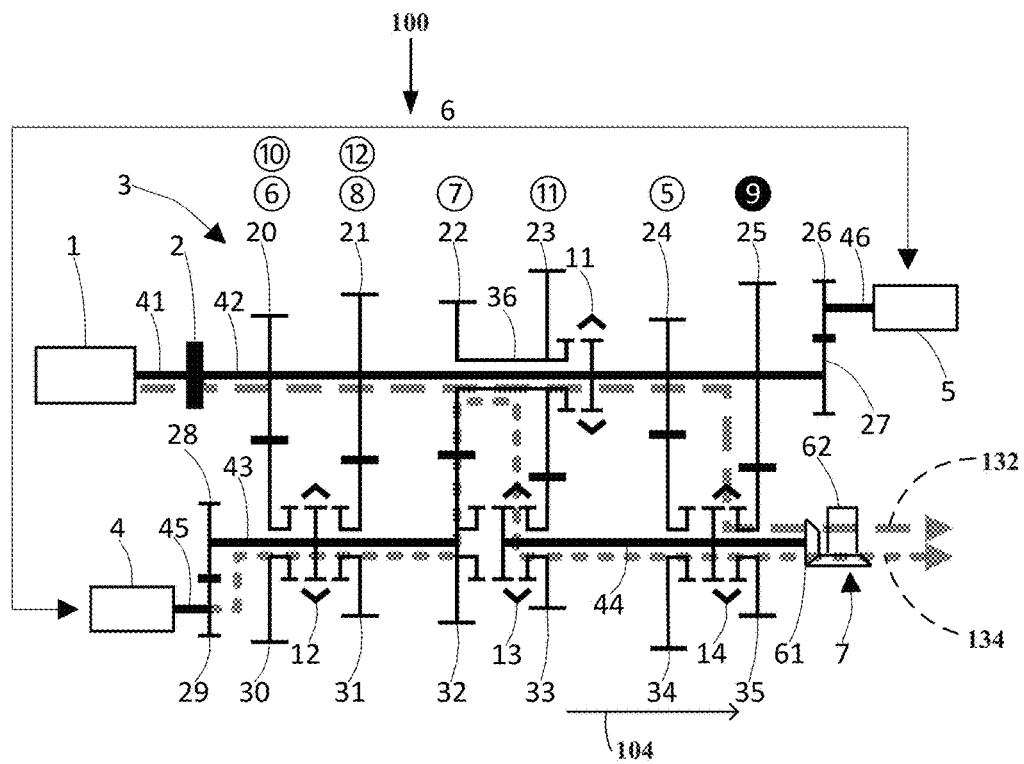
FIG. 9 schematically illustrates a torque flow path through the hybrid drive system of FIG. 1 when operating in ninth gear in preparation for further gearshifts in Parallel Hybrid mode.

FIG. 9 illustrates the process for shifting from ninth gear to tenth gear (the sixth stepped gear). The internal combustion engine 1 continues to transmit torque to output shaft 44 via the coupling device 14 engaged with the gearwheel 35, as indicated by arrow 132. The coupling device 13 can be shifted from in the direction of arrow 104 such that the coupling device 13 engages gearwheel 33, which can provide another gear ratio between the secondary input shaft 43 and the output shaft 44. During the shifting process, the electric motor 4 can be controlled to provide minimal torque output and to synchronize the rotational speed of the gearwheel 33 with the main output shaft 44 via the coupling device 13, as indicated by arrow 134. Therefore, the gear ratio for the electric motor 4 can be provided by gearwheel pairs 28 and 29, 22 and 32, 23 and 33, or any combination thereof.

Figure 10:
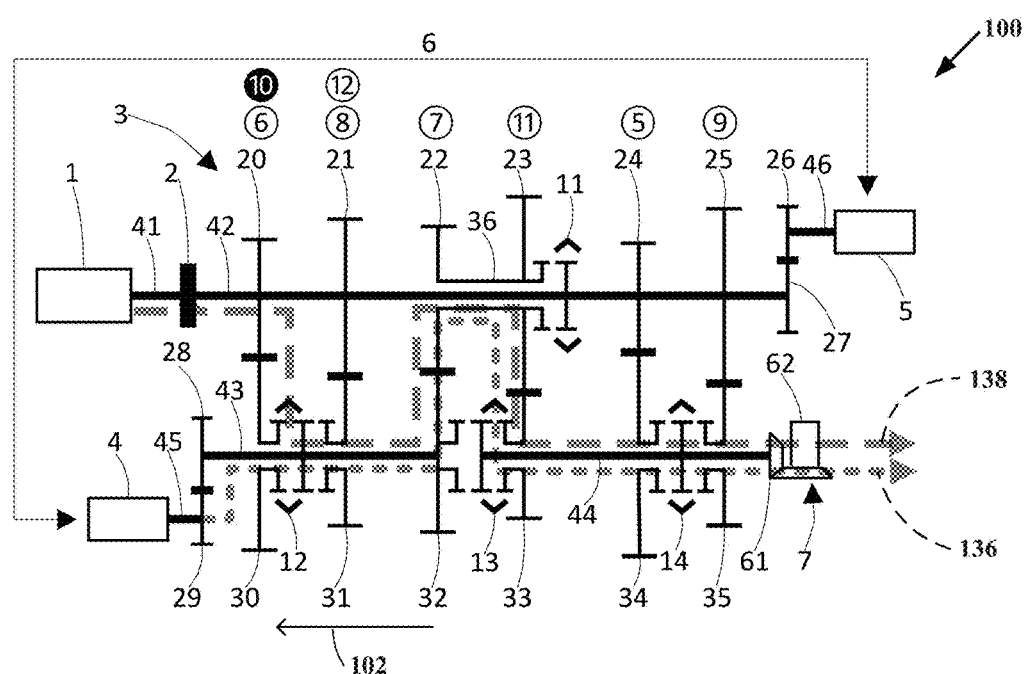
FIG. 10 schematically illustrates a torque flow path through the hybrid drive system of FIG. 1 when operating in tenth gear in Parallel Hybrid mode.

FIG. 10 shows the torque flow path through the hybrid drive system 100 when operating in tenth gear (the sixth stepped gear). Coupling device 14 can be moved to central (i.e., neutral) position, and the main clutch 2 can be disengaged from the internal combustion engine 1. The electric motor 4 can provide continuous torque to output shaft 44 while the torque output from the internal combustion engine 1 is decreased (i.e., a first torque shift), as indicated by arrow 136. The electric motor 5 can then regulate the rotational speed of the main input shaft 42 for quick synchronization of the rotational speed of the gearwheel 30 with the rotational speed of the secondary input shaft 43 (i.e., speed synchronization). With coupling device 12 moved in the direction arrow 102 to engage the gearwheel 30 and the main clutch 2 re-engaged with the internal combustion engine 1, the torque output from internal combustion engine 1 can be increased and the torque output from the electric motor 4 can be quickly reduced (i.e., a second torque shift). In the embodiment shown, torque provided by the internal combustion engine 1 can be transmitted to the output shaft 44 in the manner indicated by arrow 138. Through coordinated operation of the internal combustion engine 1, the electric motors 4 and 5, the main clutch 2, and the coupling devices 12, 13 and 14, constant torque can be transmitted to the output shaft 44 during the gear change. When operating in tenth gear, torque provided by the internal combustion engine 1 can be transmitted to the output shaft via the gear ratios provided by gearwheels 20 and 30, gear wheels 22 and 32, gear wheels 23 and 33, or any combination thereof. The gear ratio for the electric motor 4 can be provided by gearwheel pairs 29 and 28, 22 and 32, 23 and 33, or any combination thereof.

Figure 11:
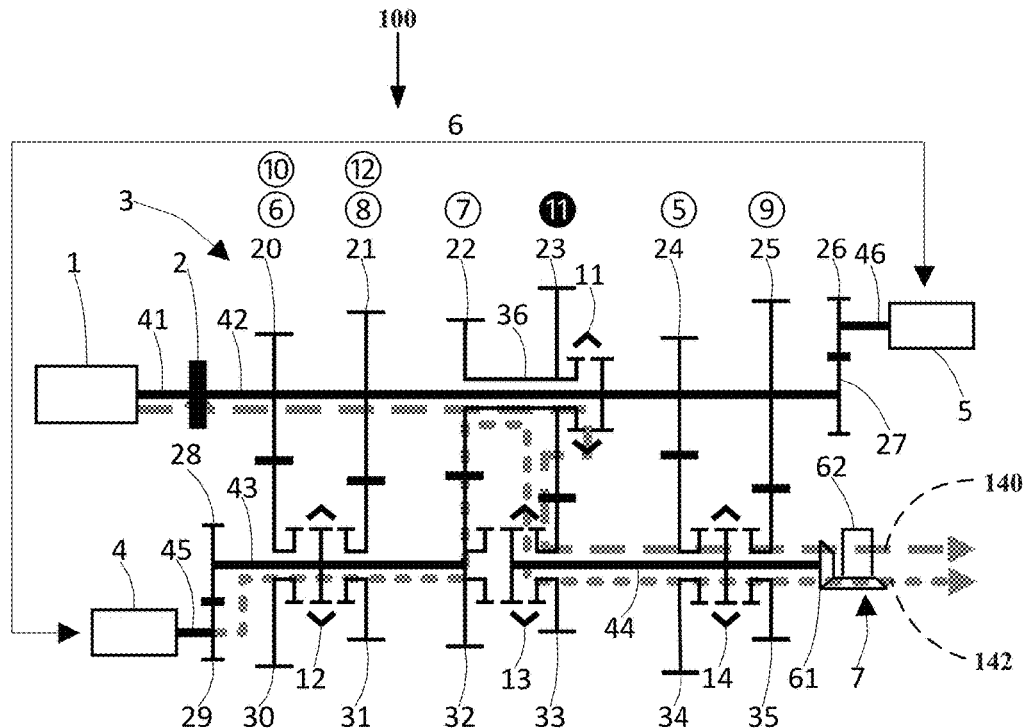
FIG. 11 schematically illustrates a torque flow path through the hybrid drive system of FIG. 1 when operating in eleventh gear in Parallel Hybrid mode.

FIG. 11 shows the torque flow path in through the hybrid drive system 100 when operating in eleventh gear (the seventh stepped gear). Prior to shifting from tenth gear to eleventh gear, the torque output of the internal combustion engine 1 can be reduced, and the torque output of the electric motor 4 can be increased to provide stable torque to the output shaft 44 (i.e., a first torque shift). Next, the main clutch 2 can be disengaged from the internal combustion engine 1 and the coupling device 12 can be moved to a neutral position. The rotational speed of the main input shaft 42 can be controlled by the electric motor 5, and can be quickly synchronized with the rotational speed of gearwheel 23 (i.e., speed synchronization). The coupling device 11 can engage the gearwheel 23 of the compound gearwheel 36, and the main clutch 2 can reengage with the internal combustion engine 1. The torque output of the internal combustion engine 1 can then be increased and the torque output of the electric motor 4 can be reduced. The torque provided by the internal combustion engine 1 can travel along the path indicated by arrow 140, while the torque provided by the electric motor 4 can travel along the path indicated by arrow 142 (i.e., a second torque shift). Through the coordinated operation of the internal combustion engine 1, the electric motors 4 and 5, the main clutch 2, and the coupling devices 11 and 13, constant torque can be supplied to the output shaft 44 during the gear change. When operating in eleventh gear, the gear ratio by which the internal combustion engine 1 transmits torque to the output shaft is provided by gearwheels 23 and 33, and the gear ratio for the electric motor 4 remains the same as for tenth gear.

Figure 12:
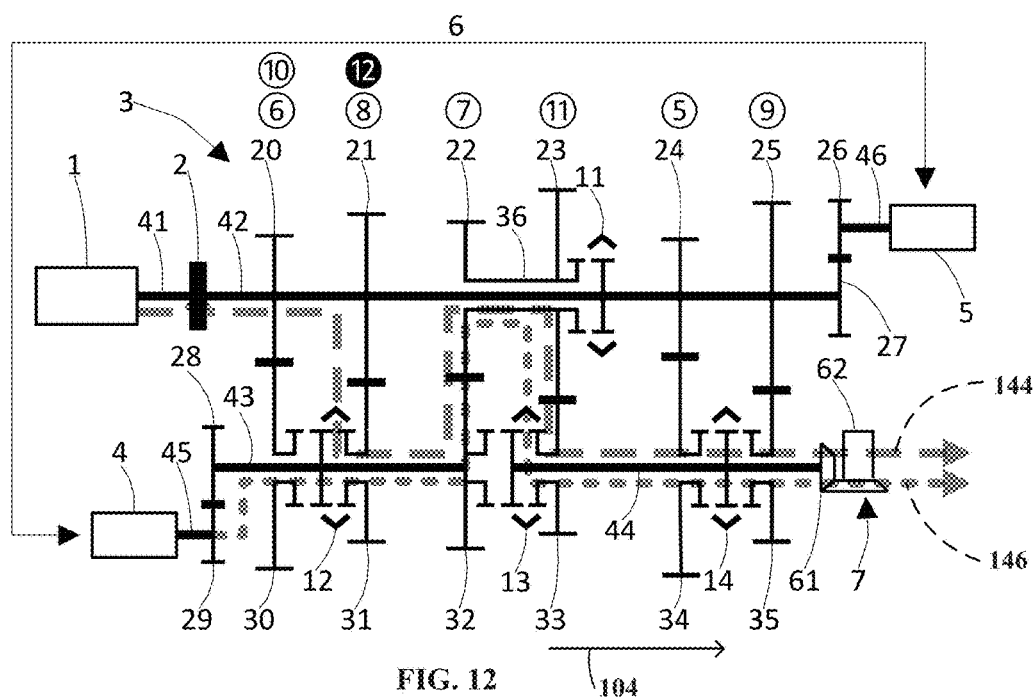
FIG. 12 schematically illustrates a torque flow path through the hybrid drive system of FIG. 1 when operating in twelfth gear in Parallel Hybrid mode.

FIG. 12 shows torque pathway through the hybrid drive system 100 when operating in twelfth gear (the eighth stepped gear). After the torque output of the internal combustion engine 1 is reduced and the torque output of the electric motor 4 is increased, the main clutch 2 can be disengaged from the internal combustion engine 1 and the coupling device 11 can disengage from the gearwheel 23 and move to a neutral position. The electric motor 5 can regulate the rotational speed of the main input shaft 42 to quickly synchronize the rotational speed of the gearwheel 31 with the rotational speed of the secondary input shaft 43 (i.e., speed synchronization). The coupling device 12 can then move in the direction of arrow 104 to engage the gearwheel 31, and the main clutch 2 can reengage the internal combustion engine 1. The torque output from internal combustion engine 1 can then be increased while the torque output from the electric motor 4 can be quickly decreased. Through coordinated operation of the internal combustion engine 1, the electric motors 4 and 5, the main clutch 2, and the coupling devices 12 and 13, constant torque can be provided to the output shaft 44 during the gear change. The gear pathway for torque provided by the internal combustion engine 1 to the output shaft 44 includes gearwheel pairs 21 and 31, 32 and 22, and 23 and 33, as indicated by arrow 144. Similarly, the gear pathway for torque provided by the electric motor 4 to the output shaft 44 includes gearwheel pairs 29 and 28, 32 and 22, and 23 and 33, as indicated by arrow 146.

In EV driving mode, the internal combustion engine 1 can turned off, and the main clutch 2 can be disengaged to reduce friction loss associated with the engine pistons, provided that accessory units such as power steering pumps and air conditioning compressors can be powered by the electric motors 4 and 5. The internal combustion engine 1 can also be driven by electric motor 5 to provide power to accessory units which cannot be driven by the electric motors 4 and 5 directly. The control logic for implementing such functions is further described below. In some embodiments, all eight stepped gears previously described can be used by the electric motor 5. In some embodiments, ten stepped gears ratios can be used by electric motor 4 through coordinated combinations of coupling devices 11, 12, 13 and 14. In some embodiments, four gear ratios are employed for the EV driving mode, with traction power for first and third gears provided by electric motor 5 and traction power in second and fourth gears provided by electric motor 4. The two electric motors 4 and 5 can either work alternatively at selected gears to reduce energy consumption, or can work together to meet high torque requirements (such as sudden acceleration). Through coordinated control of the two electric motors 4 and 5, constant torque transmission to output shaft 44 is also achievable during gear changes, similar to the parallel hybrid mode.

Figure 13:
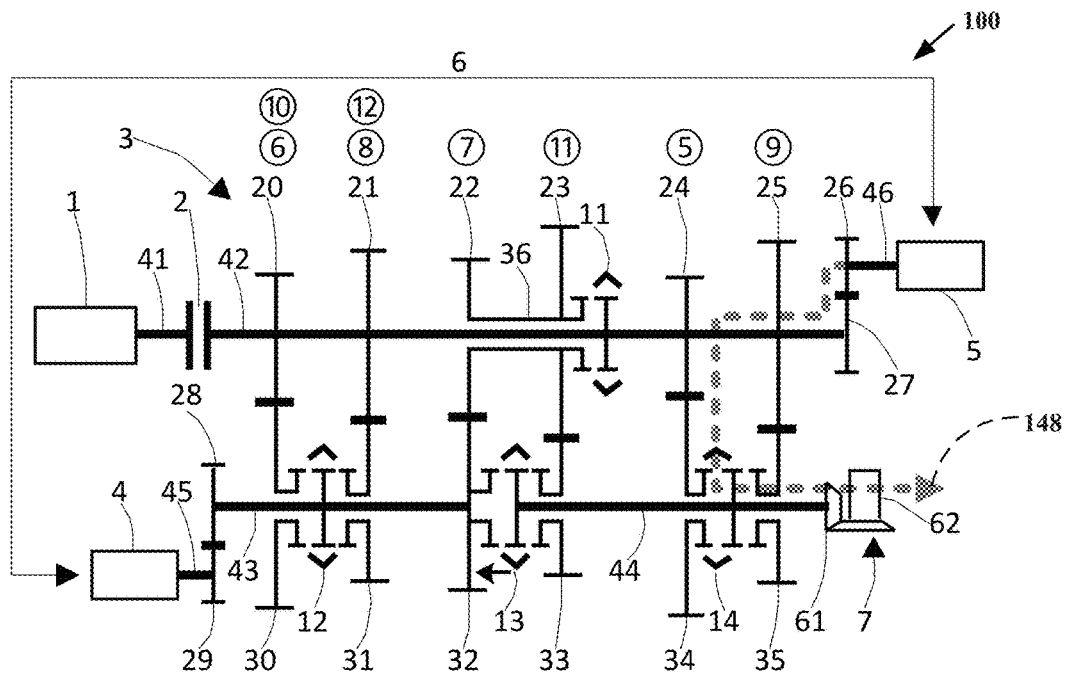
FIG. 13 schematically illustrates a torque flow path through the hybrid drive system of FIG. 1 when operating in first gear in EV driving mode.

FIG. 13 shows the torque pathway through the hybrid drive system 100 with first gear engaged in EV driving mode. The electric motor 5 transmits torque to output shaft 44 via gearwheel pair 24 and 34 with the coupling device 14 engaged with the gearwheel 34, as indicated by arrow 148. In some embodiments, at least a portion of the kinetic energy of the vehicle can be recovered during deceleration through generating electrical energy with the electric motor 5 (e.g., regenerative braking).

Figure 14:
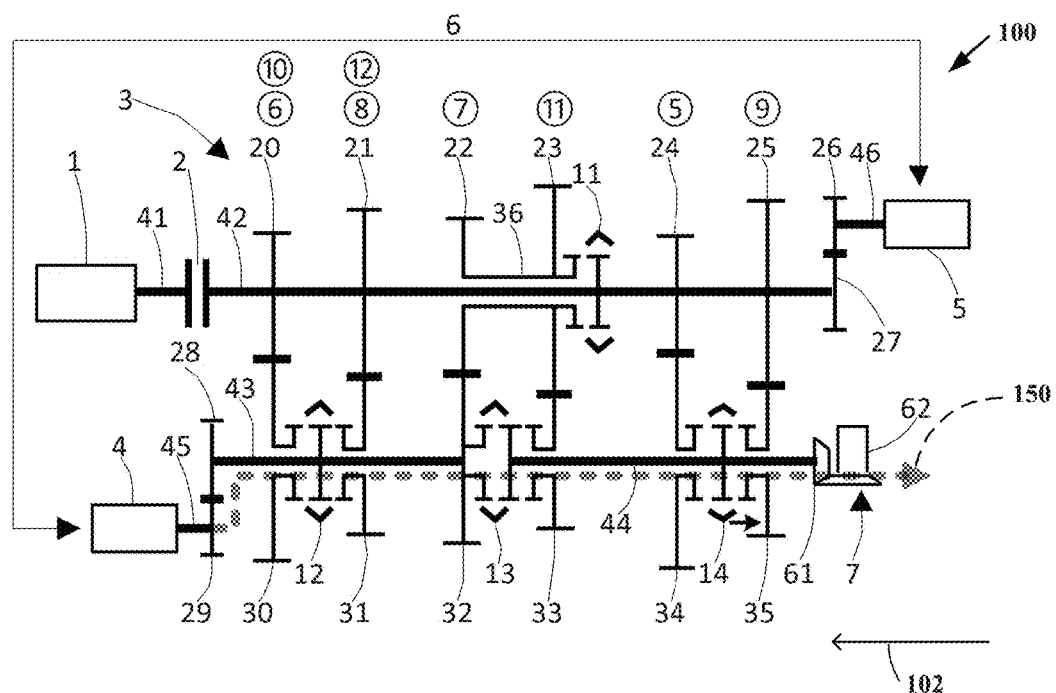
FIG. 14 schematically illustrates a torque flow path through the hybrid drive system of FIG. 1 when operating in second gear in EV driving mode.

FIG. 14 shows the torque pathway through the hybrid drive system 100 while driving in second gear in EV mode. The electric motor 4 can be controlled to quickly synchronize the rotational speed of the secondary input shaft 43 with the rotational speed of the output shaft 44 via the coupling device 13 engaged with gearwheel 32 in the direction of arrow 102. Next, torque from the electric motor 4 can be increased, and torque from electric motor 5 can be decreased to move the coupling device 14 to an uncoupled, neutral position. The pathway for torque provided to the output shaft 44 by the electric motor 4 is indicated by arrow 150. In alternative embodiments, the two electric motors 4, 5 can also simultaneously provide torque to the output shaft 44. The gearshift process from first gear to second gear is completed with at least one torque path.

Figure 15:
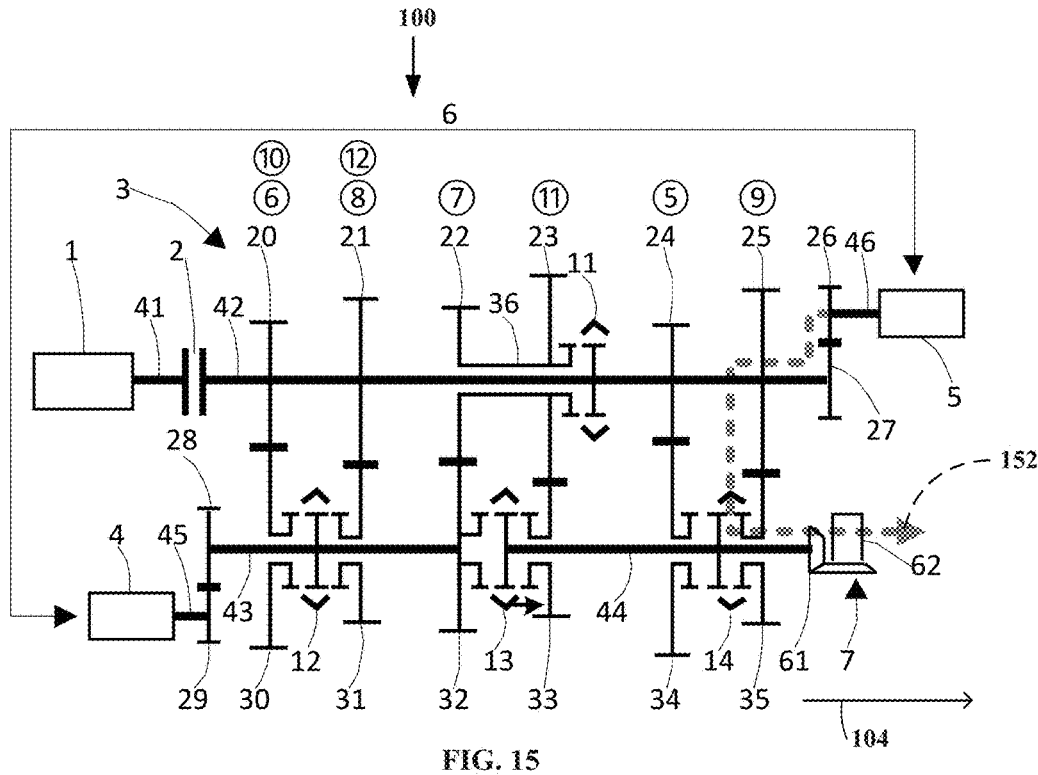
FIG. 15 schematically illustrates a torque flow path through the hybrid drive system of FIG. 1 when operating in third gear in EV driving mode.

FIG. 15 shows the torque pathway through the hybrid drive system 100 while driving in third gear in EV mode. The electric motor 5 can synchronize the rotational speed of the main input shaft 42 with the rotational speed of the output shaft 44 via the gearwheel 35. After coupling device 14 is moved to engage the gearwheel 35 in the direction of arrow 104, the torque from electric motor 5 can be increased, and the torque output from the electric motor 4 can be reduced. The torque pathway from the electric motor 5 to the output shaft 44 is indicated by arrow 152. In some embodiments, the electric motor 4 can work together with the electric motor 5 to drive the vehicle. In some embodiments, the electric motor 4 can be disengaged from the output shaft by disengaging the coupling device 13 from the gearwheel 32.

Figure 16:
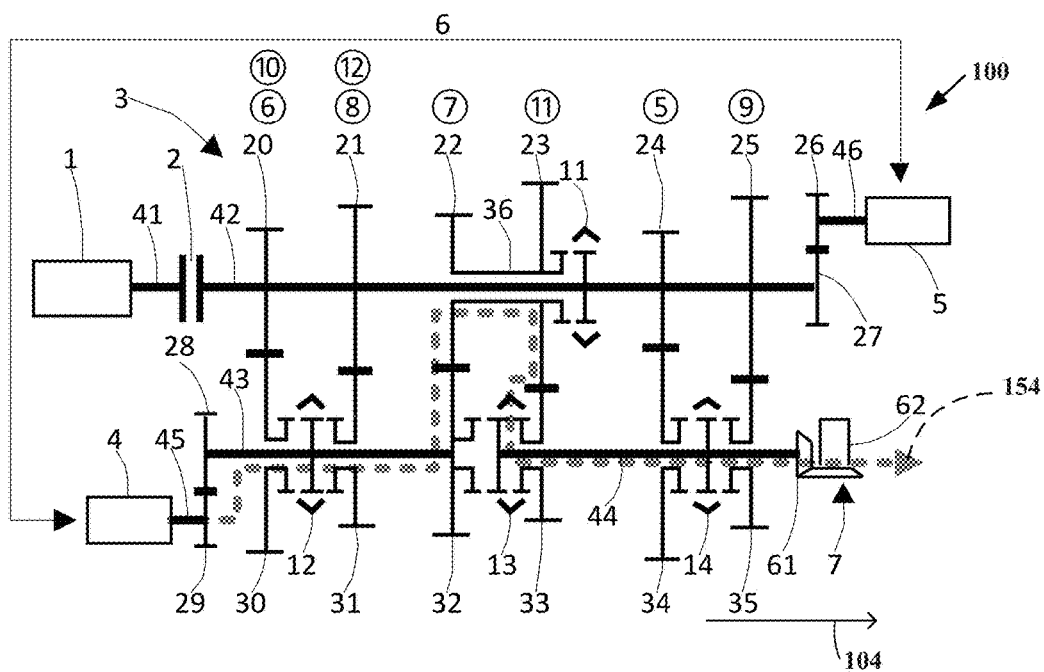
FIG. 16 shows a schematic diagram and energy flow path through the hybrid drive system of FIG. 1 when operating in fourth gear in EV driving mode.

FIG. 16 shows torque pathway through the hybrid drive system 100 while driving in fourth gear in EV mode. Coupling device 14 can be disengaged after torque supply is shifted to electric motor 4 from electric motor 5. A new gear train is created by engaging coupling device 13 with the gearwheel 33 in the direction indicated by arrow 104. In this manner, torque from electric motor 4 can be sent to the output shaft 44 via the gearwheel pairs 32 and 22, and 23 and 33, as indicated by arrow 154. In some embodiments, the electric motor 5 can continue to provide torque to output shaft 44 to assist electric motor 4 in propelling the vehicle.

Figure 17:
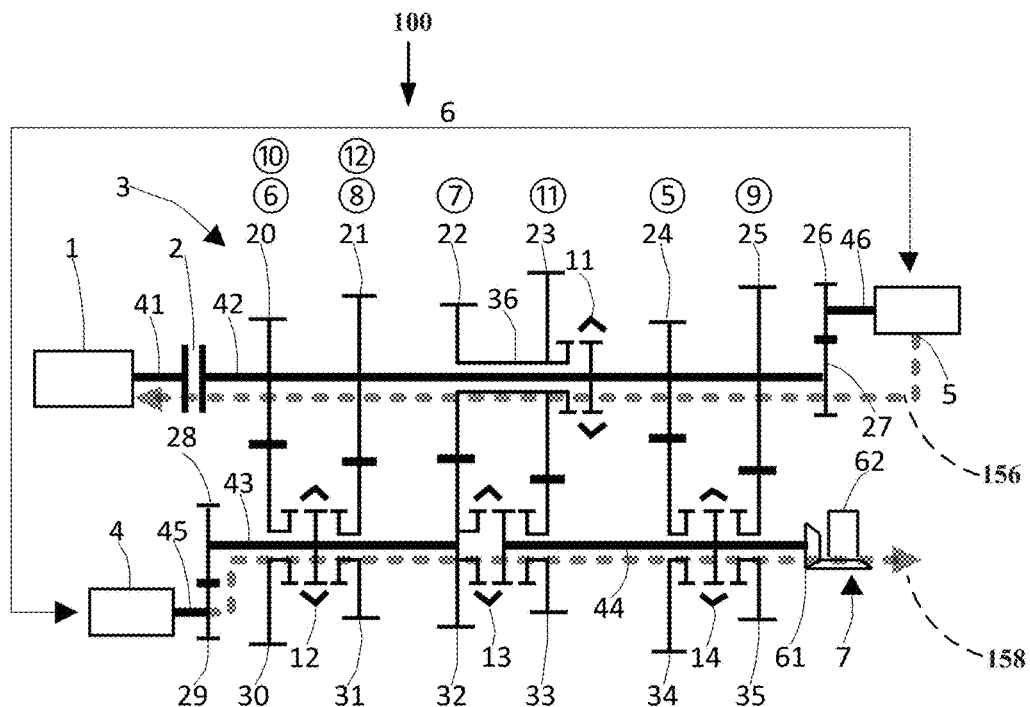
FIG. 17 schematically illustrates a torque flow path through for engine start-up in EV driving mode.

FIG. 17 shows the torque pathway through the hybrid drive system 100 during startup of the internal combustion engine 1. The electric motor 4 can provide torque to output shaft 44, as illustrated by the arrow 158, and the electric motor 5 can serve the role of engine starter by transmitting torque to the internal combustion engine 1 along the main input shaft 42, as illustrated by arrow 156. The main clutch 2 can be controlled to transmit torque to the internal combustion engine 1.

Figure 18:
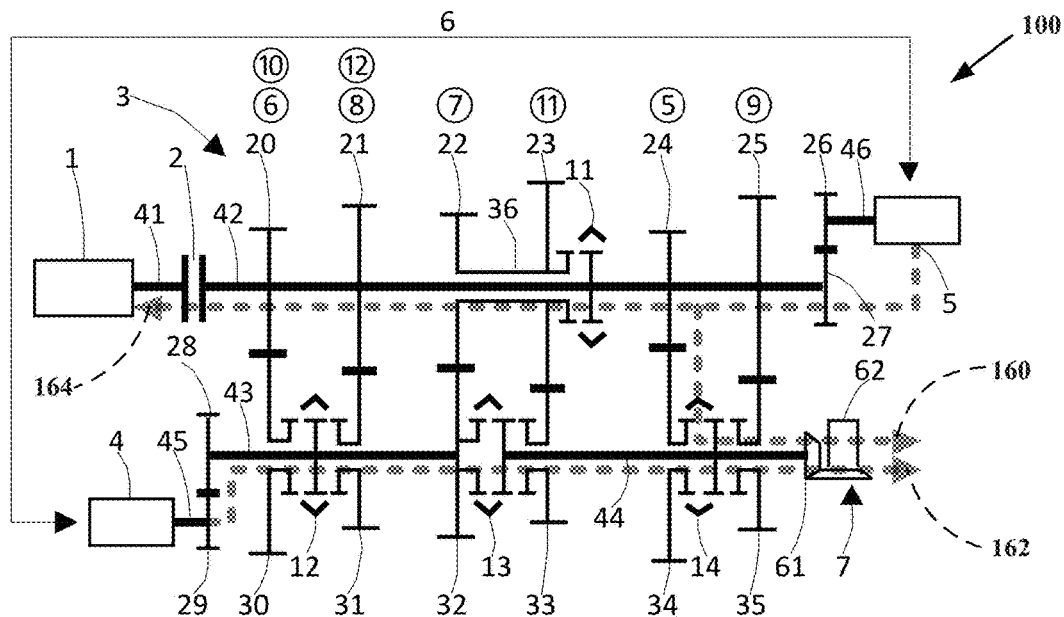
FIG. 18 schematically illustrates a torque flow path for engine start-up in EV driving mode.

FIG. 18 shows another torque pathway through the hybrid drive system 100 during startup of the internal combustion engine 1. Torque output from the electric motor 4 can be joined with torque output from the electric motor 5 by the coupling device 14 to propel vehicle, as indicated by arrows 160 and 162. Meanwhile, part of the torque output from the electric motor 5 can be sent to the internal combustion engine 1 via controlled main clutch 2 for engine start-up, as indicated by arrow 164.

The hybrid drive system 100 can allow the vehicle to back up by running one or both of the electric motors 4 and 5 in reverse.

Figure 19:
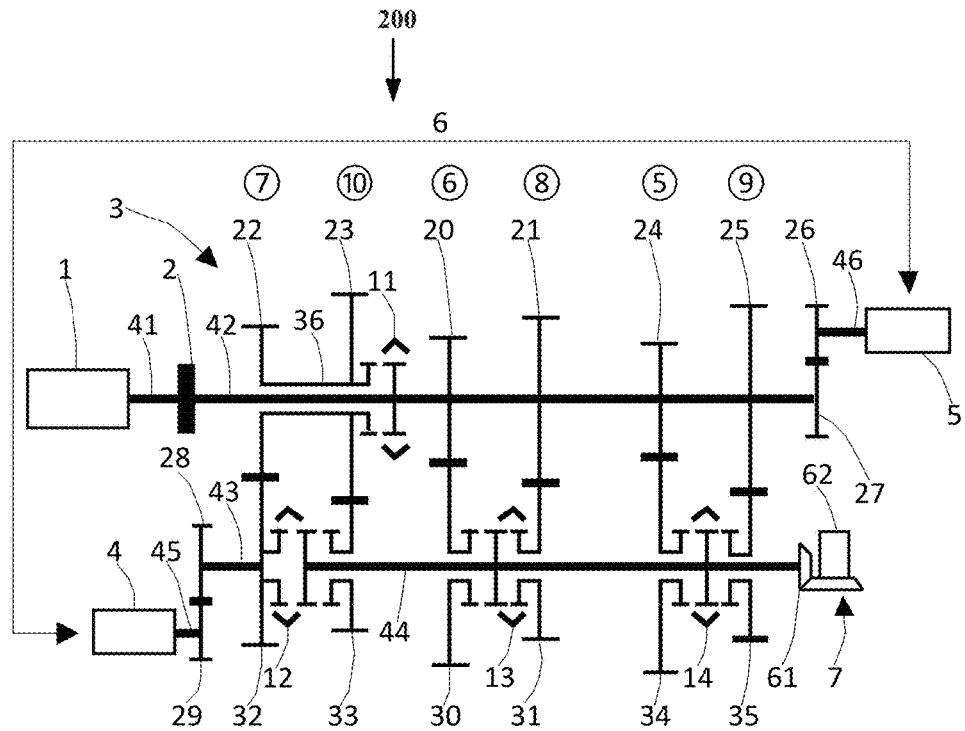
FIG. 19 shows a schematic diagram of another embodiment of a hybrid drive system.

FIG. 19 illustrates another embodiment of a hybrid drive system 200. As compared to the embodiment of FIG. 1, the compound gear 36 is mounted closer to the main clutch 2 and the secondary input shaft 43 is shorter than its counterpart in the embodiment of FIG. 1. The hybrid drive system can include a plurality of gearwheels disposed on the main input shaft 42, the secondary input shaft 43, and the output shaft 44. Gearwheels 20, 21, 22, 23, 24, and 25 can be mounted to the main input shaft 42. Gearwheels 28 and 32 can be mounted to the secondary input shaft 43. Gearwheels 30, 31, 33, 34, and 35 can be mounted to the output shaft 44. In the embodiment shown, the gearwheels of the main input shaft 42 and the gearwheels of the secondary input shaft 43 or output shaft 44 can be configured to engage one another in pairs. In the embodiment shown, gearwheels 20 and 30, gear wheels 21 and 31, gear wheels 22 and 32, gearwheels 23 and 33, gearwheels 24 and 34, and gearwheels 25 and 35, respectively, can be configured to selectively engage one another depending upon the position of the coupling device 11, 12, 13, and 14. In this manner, the hybrid drive system 200 can provide a total of six stepped gear ratios (e.g., fifth gear to tenth gear).

Figure 20:
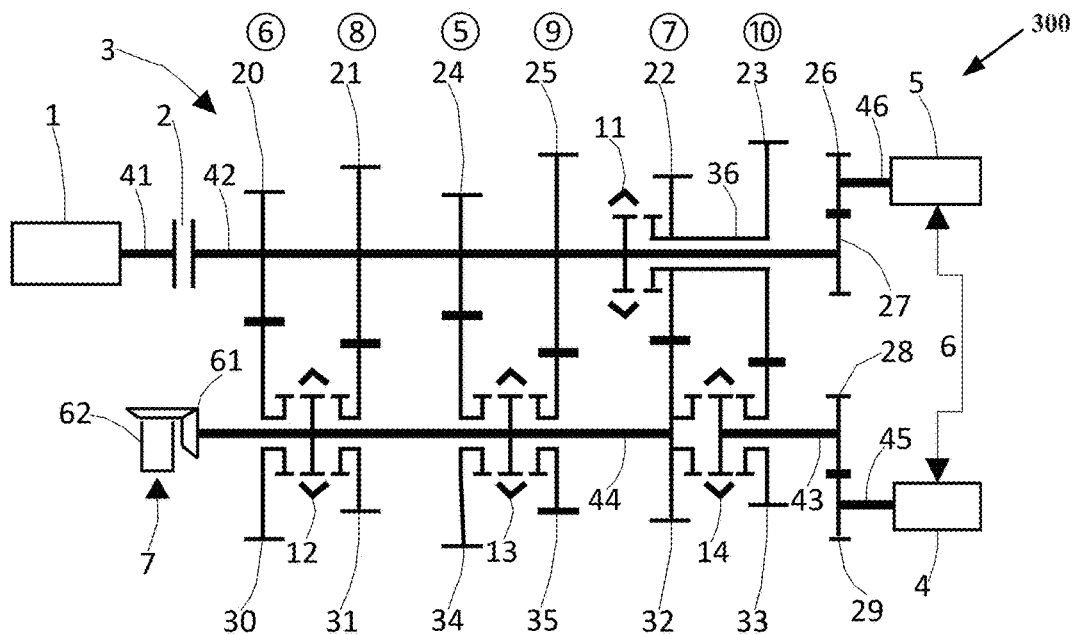
FIG. 20 shows a schematic diagram of the hybrid drive system in the third embodiment in neutral position.

FIG. 20 illustrates another embodiment of a hybrid drive system 300. The hybrid drive system 300 can include a compound gear 36 mounted on the opposite end of the main input shaft 42 from the main clutch 2. In the embodiment shown, the final drive 7 is located on the same side of the hybrid drive system 300 as the internal combustion engine 1, and the two electric motors 4 and 5 are located on the opposite side of the hybrid drive system from the internal combustion engine 1. This embodiment can include e-CVT functionality and 6 stepped gear ratios (e.g., fifth to tenth gear).

Figure 21:
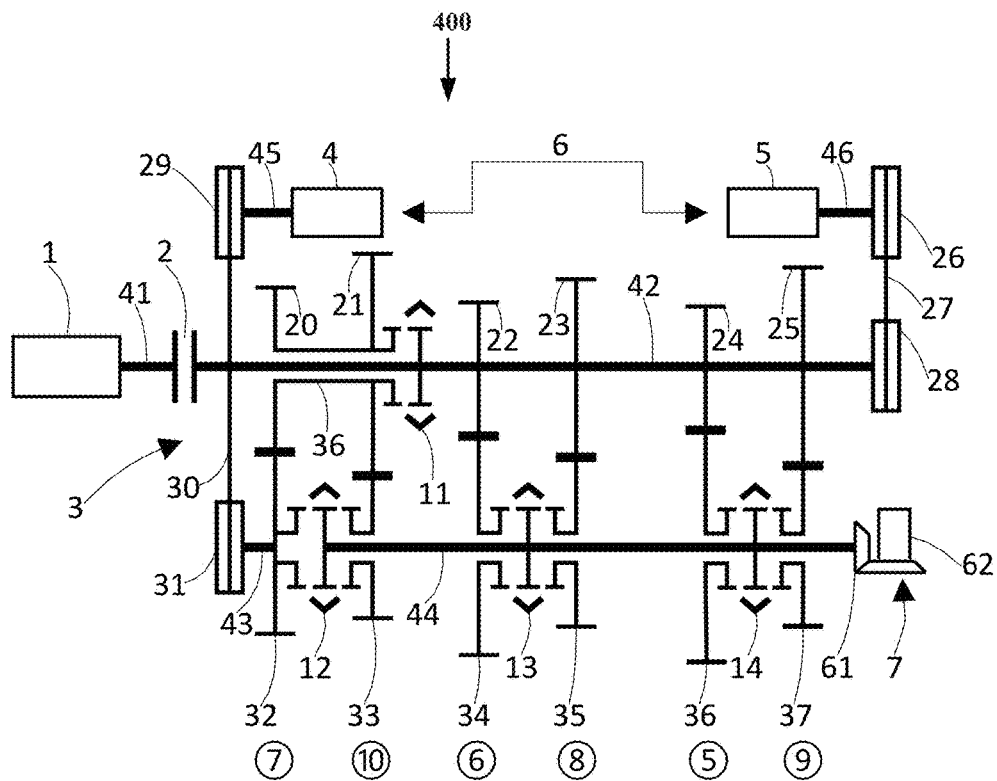
FIG. 21 shows a schematic diagram of the hybrid drive system in the fourth embodiment in neutral position.

FIG. 21 illustrates another embodiment of a hybrid drive system 400. The hybrid drive system can include a transmission 3 similar to the transmission of the embodiment of FIG. 19, but with a different arrangement of the two electric motors 4 and 5. More specifically, the electric motors 4 and 5 can be mounted on the opposite side of the main input shaft 42 from the secondary input shaft 43 and the output shaft 44, and can be connected to the main input shaft and/or the secondary input shaft 32 and/or the output shaft 44 by one or more chains or belts. In some embodiments, the hybrid drive system 400 can be a compact design and can reduce the installation space required in a vehicle into which it is incorporated.

FIGS. 22-37 illustrate another embodiment of a hybrid drive system 500. The hybrid drive system 500 can include an irreversible drive machine and a reversible drive machine, both of which transfer torque to a final drive via a parallel shaft transmission. The hybrid drive system 500 can be applicable to hybrid electric vehicles (HEVs), plug-in hybrid electric vehicles (PHEVs), fuel cell hybrid electric vehicles (FCHEVs) and pure electric vehicles (EVs), as well as other applications with blended drives.

In the embodiment shown, the primary components of the hybrid drive system 500 include a parallel shaft transmission, an irreversible drive machine, such as an internal combustion engine 1, and one reversible drive machine, such as an electric motor 4. In some embodiments, the parallel shaft transmission can be an automated manual transmission 3. In some embodiments, the automated manual transmission 3 can include one main input shaft and a single clutch, or can be a dual-clutch transmission with two main input shafts and two clutches.

The shafts of the internal combustion engine 1 and the electric motor 4 can be coupled together by the automated manual transmission 3, which can include at least one main input shaft 42, one secondary input shaft 43 (FIG. 23), one output shaft 44, at least one clutch 2 (which can be dry or wet), as well as a plurality of gearwheels mounted to the various shafts. In some embodiments, the internal combustion engine 1 can be replaced by a more generic reversible drive machine, such as an electric motor. In some embodiments, the reversible drive machine can be, for example, a hydraulic motor.

The hybrid drive system 500 can include two drive machines and can work in different operational modes. In some embodiments, the internal combustion engine 1 can provide the majority of the motive power while the electric motor 4 can assist as needed. In some embodiments, motive power can be provided exclusively by the electric motor 4. This can allow a hybrid vehicle into which the hybrid drive system 500 is incorporated to operate like a parallel hybrid or an electric vehicle, as desired. As compared to conventional vehicles driven exclusively by an internal combustion engine, parallel hybrid operation can save fuel and reduce emissions by virtue of functions like engine stop-start, engine booster, and energy regeneration (such as by regenerative braking). EV operation can reduce petroleum consumption by substituting electrical energy for fossil fuel as the primary energy source of the vehicle.

Figure 22:
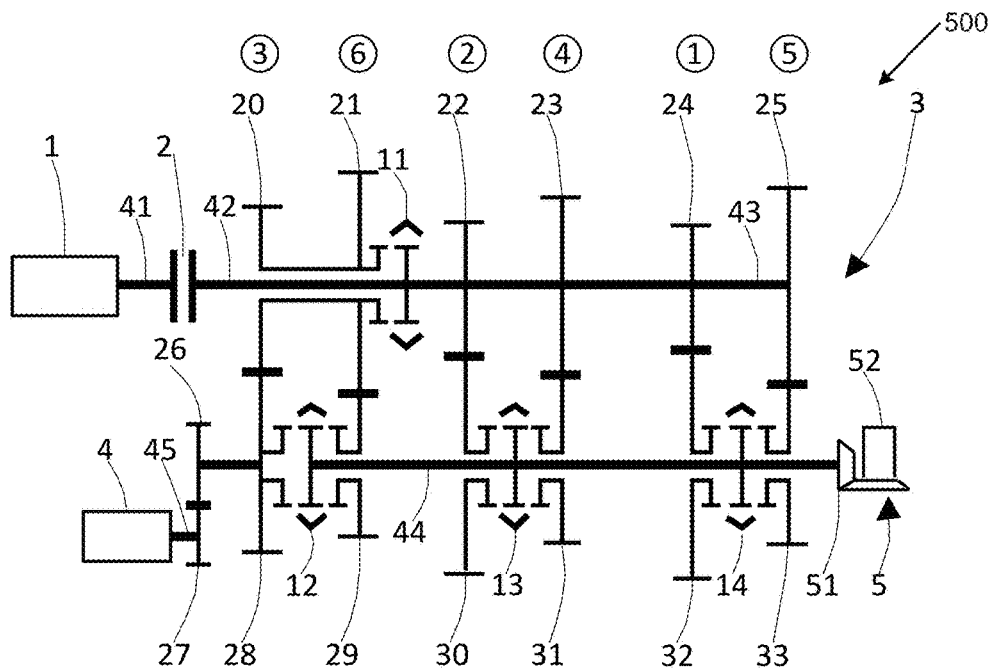
FIG. 22 illustrates another embodiment of a hybrid drive system.
Figure 23:
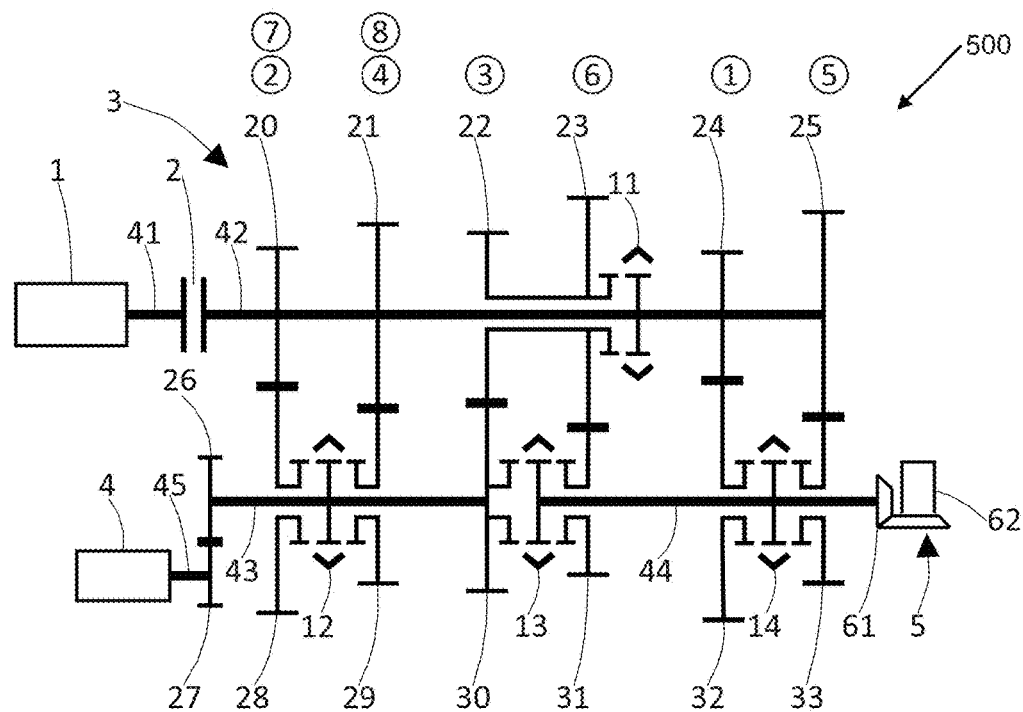
FIG. 23 illustrates another embodiment of a hybrid drive system.

FIG. 22 illustrates the hybrid drive system 500 with gearwheels 20 and 21 mounted together on a compound gearwheel on the main input shaft 42 adjacent the main clutch 2. FIG. 23 illustrates an alternative embodiment of the hybrid drive system 500 in which gearwheels 22 and 23 are mounted together on a compound gearwheel, and separated from the main clutch 2 by gearwheels 20 and 21. In some embodiments, there can be six gear ratios available for the electric motor 4, as illustrated in FIG. 22. In some embodiments, there can be eight gear ratios available for the electric motor 4, as illustrated in FIG. 23. Table 1 illustrates the positions of the coupling devices 11, 12, 13, and 14 for the various gears of the hybrid drive system 500. In Table 1, solid circles indicate that a dog clutch is engaged such that it can transmit torque of the internal combustion engine 1, while hollow circles indicate that a dog clutch associated with a particular coupling device is engaged such that it can transmit torque provided by the electric motor 4. Since an efficiency map of an electric motor is quite flat with comparison to an engine, not all available gear ratios will be used in EV mode. The designations "L" and "R" in Table 1 indicate whether the respective dog clutch is positioned to the left or the right in the figures and, hence, engaged with the respective gearwheel at the left or right position.

TABLE 1

| Gear # | 11 | L12 | R12 | L13 | R13 | L14 | R14 |
|---|---|---|---|---|---|---|---|
| 1 | ○ |  |  |  |  | ● |  |
| 2 | ○ |  |  | ● |  |  |  |
| 3 | ● | ○ | ● |  |  |  |  |
| 4 |  |  |  | ○↔○ |  | ● |  |
| 5 |  |  |  | ○↔○ |  |  | ● |
| 6 | ● |  |  | ○ | ● |  |  |

Figure 24:
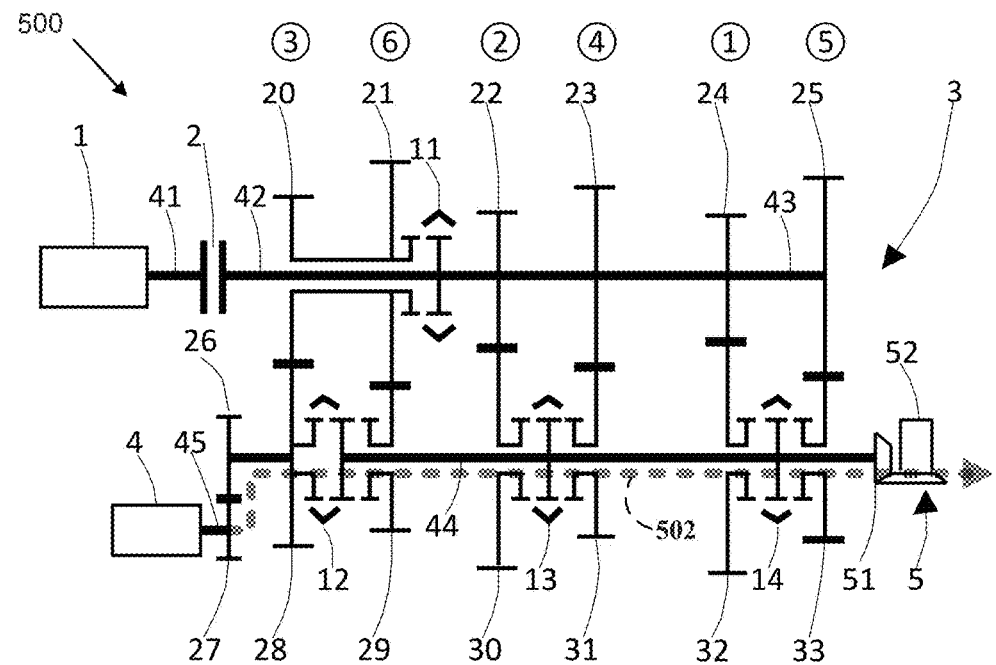
FIGS. 24-37 illustrate torque pathways through the hybrid drive system of FIG. 22 when operating in various gears, starting the internal combustion engine, and generating electricity with the electric motor.
Figure 25:
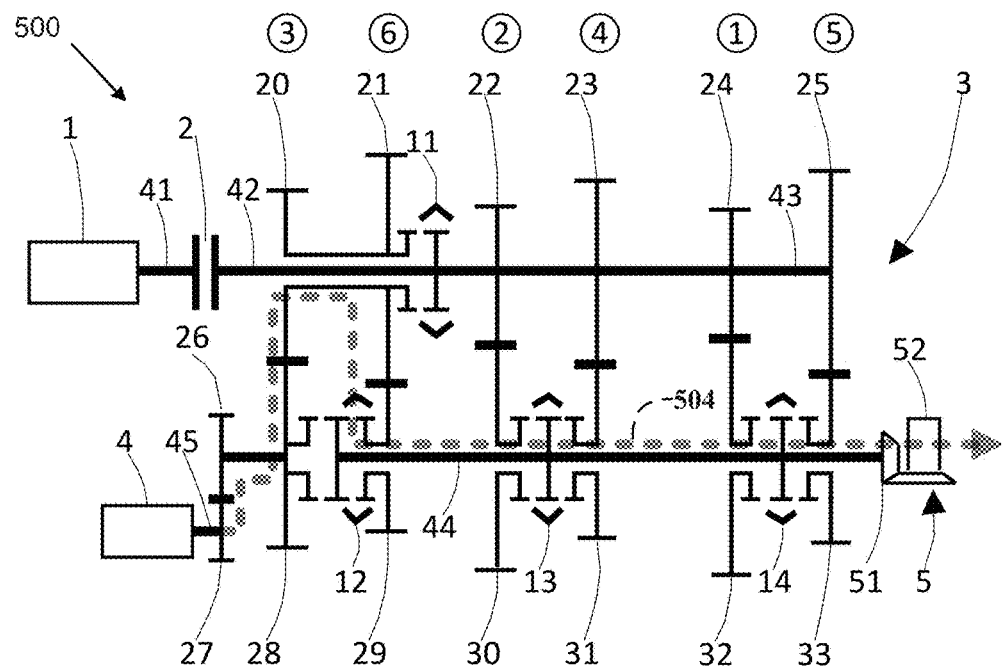
Figure 26:
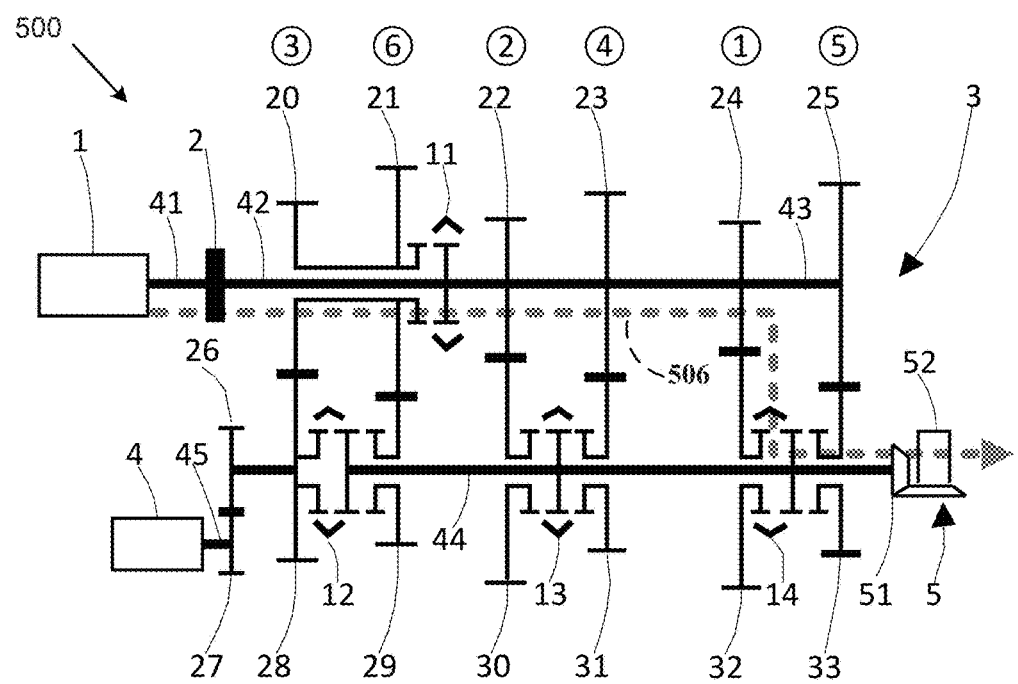
Figure 27:
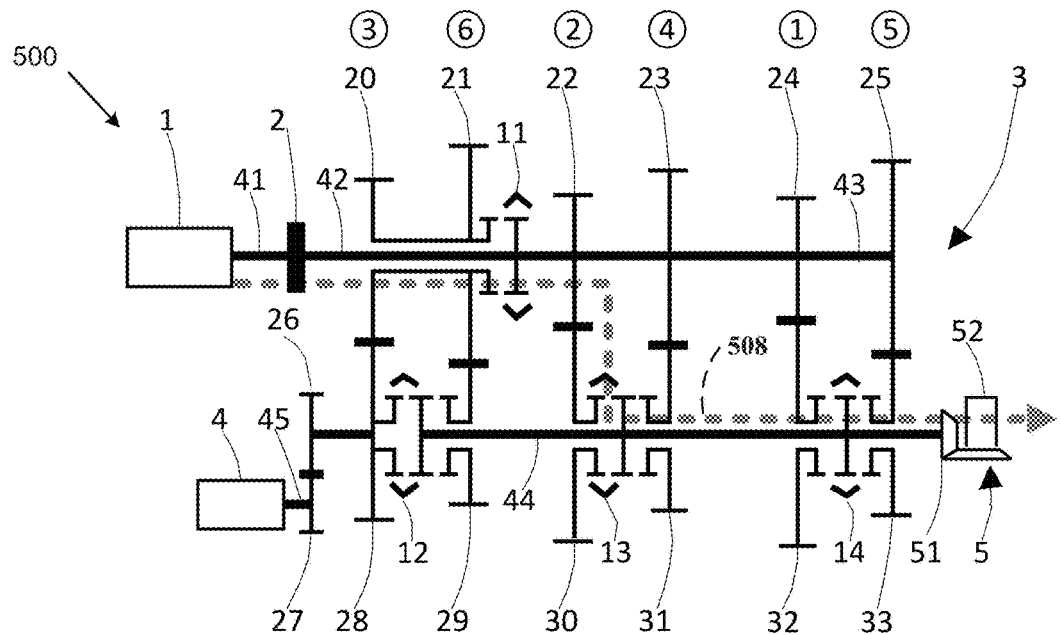
Figure 28:
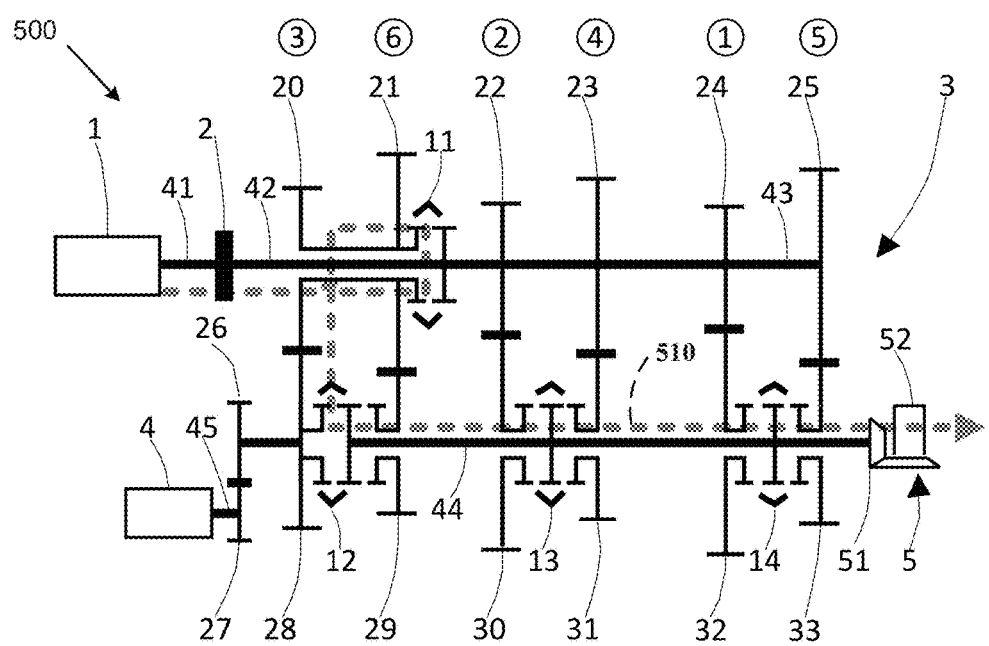
Figure 29:
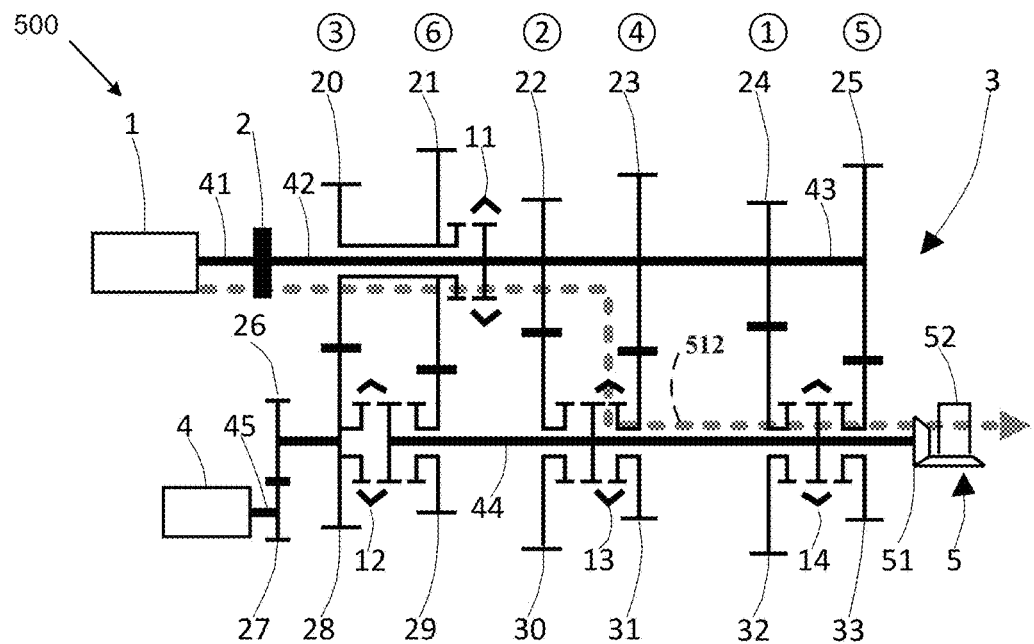
Figure 30:
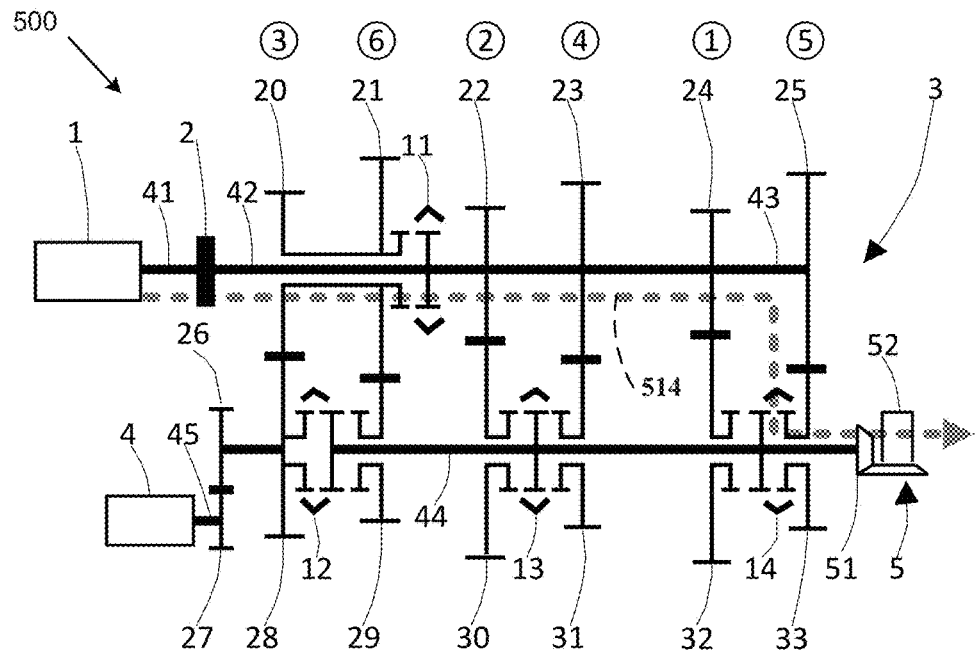
Figure 31:
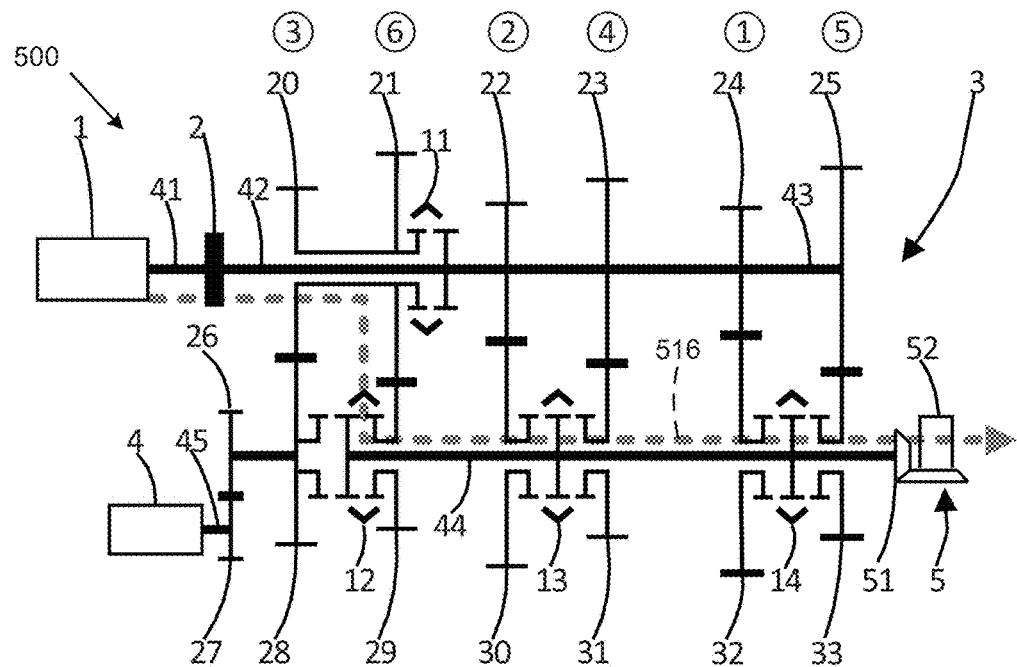

FIG. 24 illustrates the torque pathway through the hybrid drive system 500, indicated by arrow 502, for torque provided by the electric motor 4 when operating in EV mode at low speed. FIG. 25 illustrates the torque pathway through the hybrid drive system 500, indicated by arrow 504, for torque provided by the electric motor 4 when operating in EV mode at high speed. FIG. 26 illustrates the torque pathway through the hybrid drive system 500, indicated by arrow 506, for torque provided by the internal combustion engine 1 when operating in first gear. FIG. 27 illustrates the torque pathway through the hybrid drive system 500, indicated by arrow 508, for torque provided by the internal combustion engine 1 when operating in second gear. FIG. 28 illustrates the torque pathway through the hybrid drive system 500, indicated by arrow 510, for torque provided by the internal combustion engine 1 when operating in third gear. FIG. 29 illustrates the torque pathway through the hybrid drive system 500, indicated by arrow 512, for torque provided by the internal combustion engine 1 when operating in fourth gear. FIG. 30 illustrates the torque pathway through the hybrid drive system 500, indicated by arrow 514, for torque provided by the internal combustion engine 1 when operating in fifth gear. FIG. 31 illustrates the torque pathway through the hybrid drive system 500, indicated by arrow 516, for torque provided by the internal combustion engine 1 when operating in sixth gear.

Figure 32:
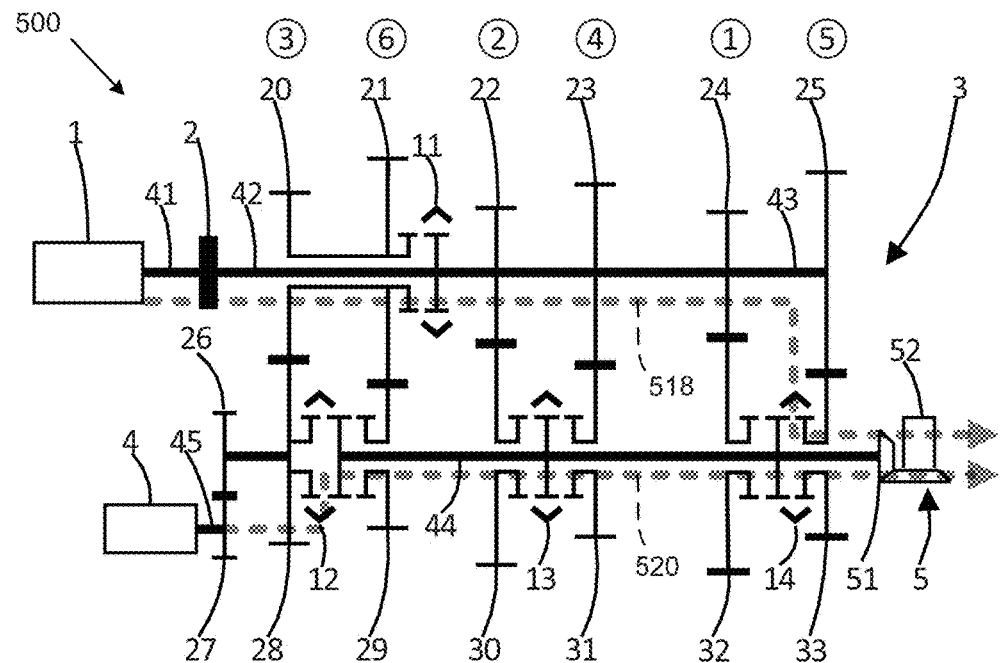
Figure 33:
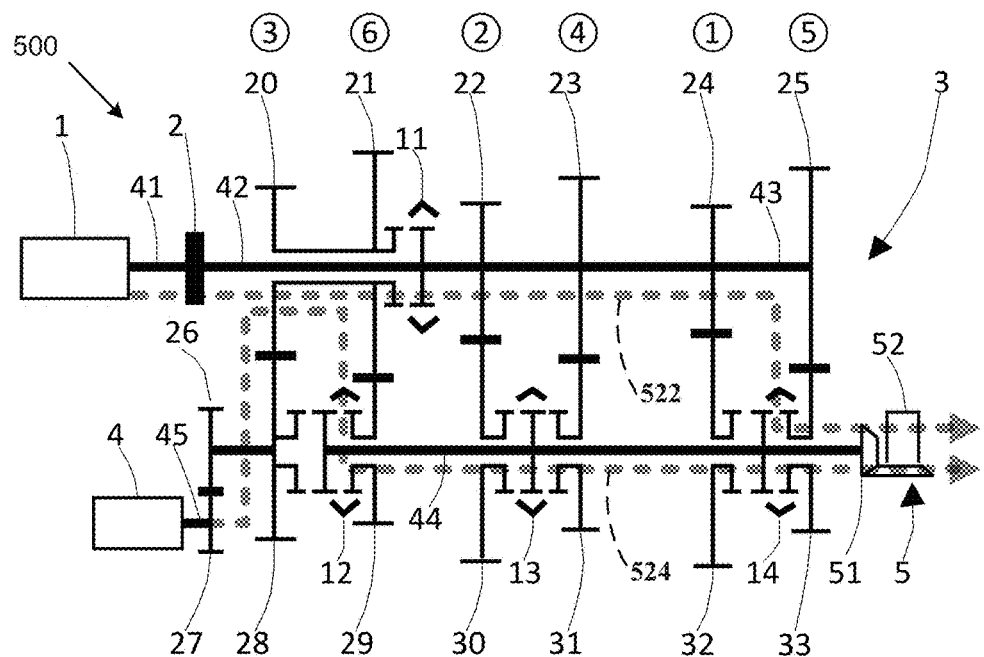
Figure 34:
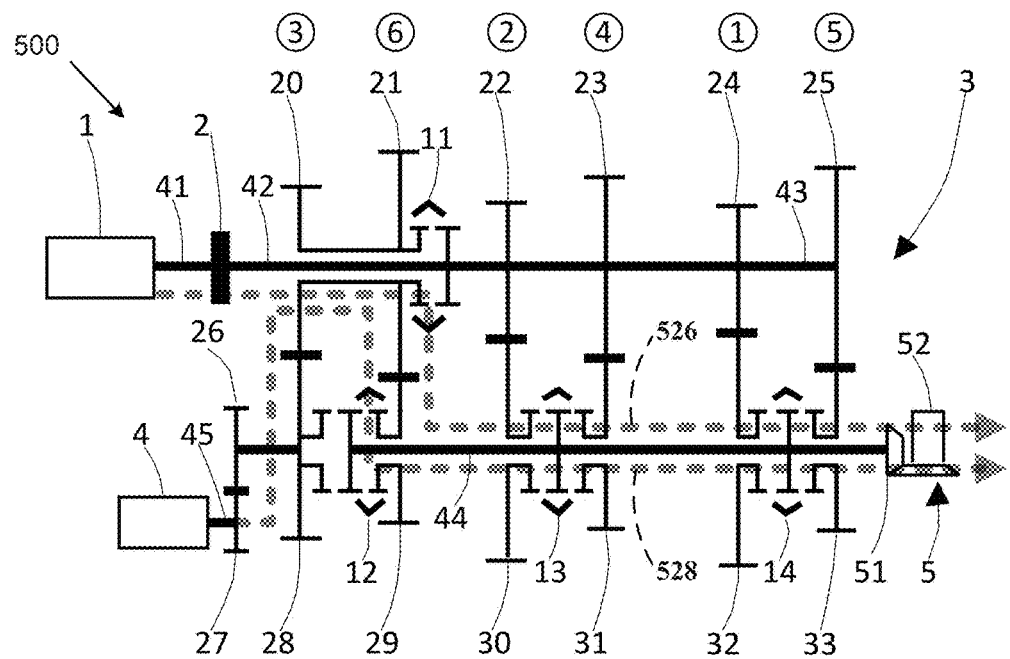
Figure 35:
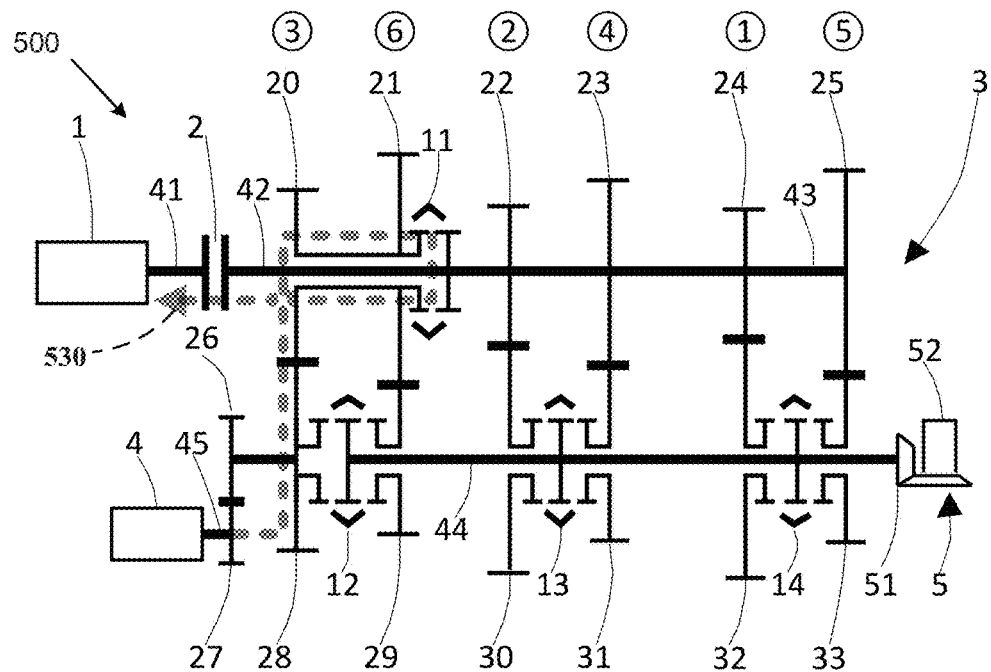
Figure 36:
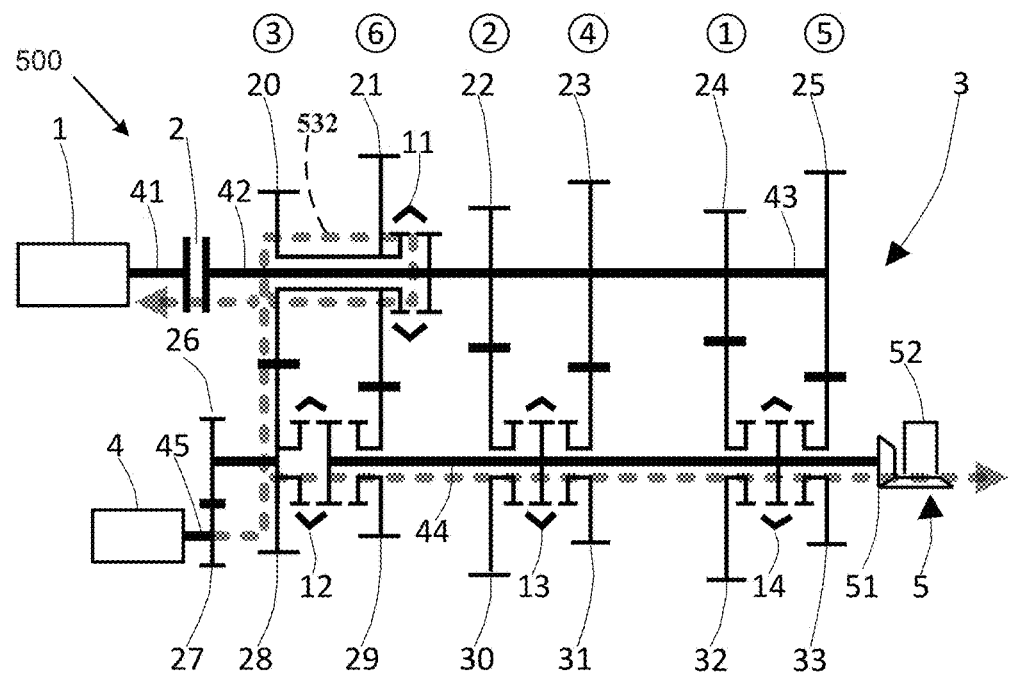
Figure 37:
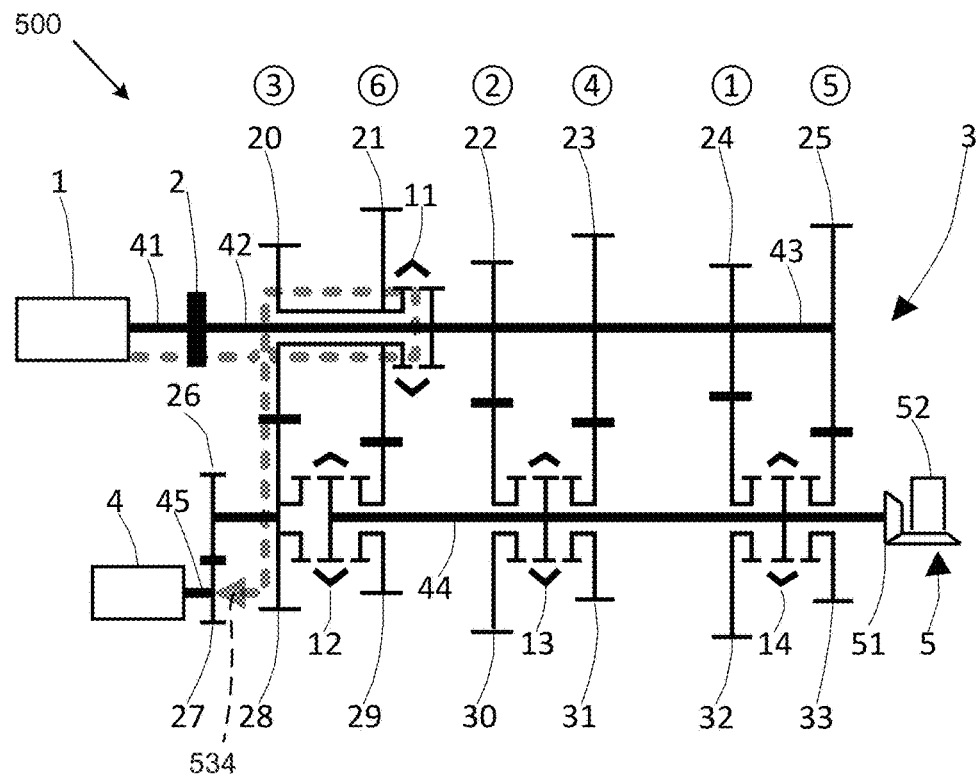
Figure 38:
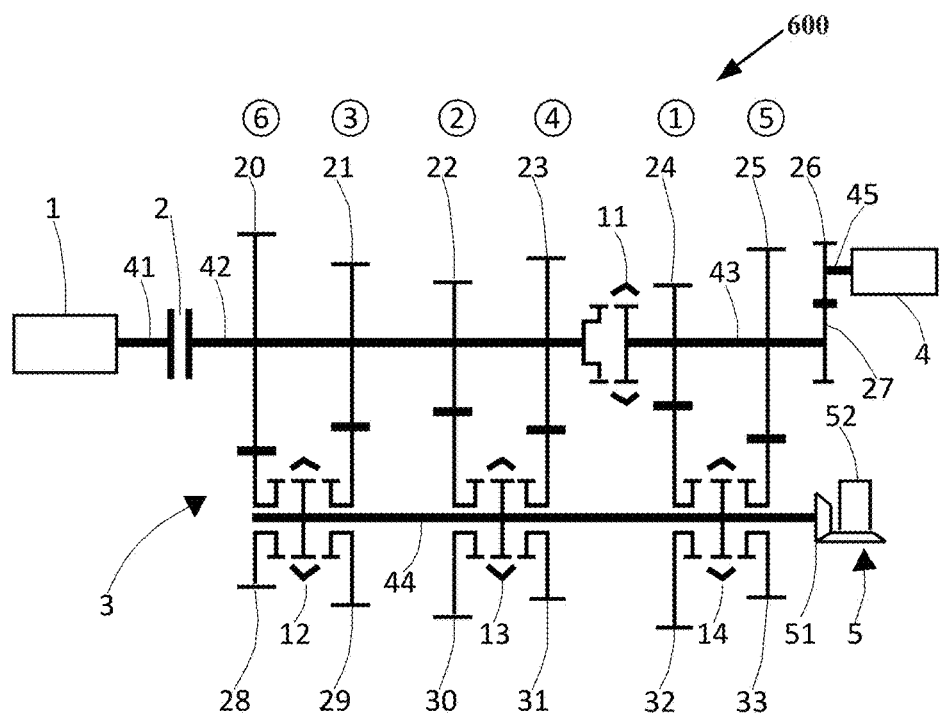
FIG. 38 illustrates another embodiment of a hybrid drive system including an internal combustion engine and an electric motor.

FIG. 32 illustrates the torque pathway through the hybrid drive system 500 for torque provided by the internal combustion engine 1, indicated by arrow 518, and for torque provided by the electric motor 4, indicated by arrow 520, when disengaging the dog clutch of coupling device 12. FIG. 33 illustrates the torque pathway through the hybrid drive system 500 for torque provided by the internal combustion engine 1, indicated by arrow 522, and for torque provided by the electric motor 4, indicated by arrow 524, when engaging the dog clutch of coupling device 12. FIG. 34 illustrates the torque pathway through the hybrid drive system 500 for torque provided by the internal combustion engine 1, indicated by arrow 526, and for torque provided by the electric motor 4, indicated by arrow 528, when shifting from fifth gear to sixth gear. FIG. 35 illustrates the torque pathway through the hybrid drive system 500 for torque provided by the electric motor 4, indicated by arrow 530, in a first method of starting the internal combustion engine 1. FIG. 36 illustrates the torque pathway through the hybrid drive system 500 for torque provided by the electric motor 4, indicated by arrow 532, in a second method of starting the internal combustion engine 1. FIG. 37 illustrates the torque pathway through the hybrid drive system 500 for torque provided by the internal combustion engine 1, indicated by arrow 534, when using the electric motor 4 to generate electricity.

FIGS. 38-52 illustrate another embodiment of a hybrid drive system 600 including an internal combustion engine 1 coupled to a main input shaft 42, and an electric motor 4 coupled to a secondary input shaft 43. The internal combustion engine 1 can be selectively coupled to the main input shaft 42 by a clutch 2, and the main input shaft 42 and the secondary input shaft 43 can be selectively coupled together by a coupling device 11. The hybrid drive system 600 can also include an output shaft 44 coupled to the main input shaft 42 and the secondary input shaft 43 by a plurality of gearwheels and by coupling devices 12, 13, and 14. In the embodiment shown, the internal combustion engine 1 and the electric motor 4 can jointly provide motive power at varying ratios, or motive power can be provided exclusively by either the internal combustion engine 1 or the electric motor 4. This can allow a hybrid vehicle into which the hybrid drive system 600 is incorporated to operate as a parallel hybrid or an electric vehicle, as desired.

In the embodiment shown, the hybrid drive system 600 can have six available gear ratios. Table 2 summarizes the position of dog clutches associated with each of the coupling devices 11, 12, 13, and 14 when operating in gears one through six. With reference to Table 2, solid circles indicate that the dog clutch of a particular coupling device is engaged such that it can transmit torque provided by the internal combustion engine 1, while hollow circles indicate that the dog clutch associated with a particular coupling device is engaged such that it can transmit torque provided by the electric motor 4. The designations "L" and "R" in Table 2 indicate whether the respective dog clutch is positioned to the left or the right in the figures and, hence, engaged with the respective gearwheel at the left or right position.

TABLE 2

| Gear # | 11 | L12 | R12 | L13 | R13 | L14 | R14 |
|---|---|---|---|---|---|---|---|
| 1 | ● |  |  |  |  | ○ | ● |
| 2 |  |  | ● |  |  | ○↔○ |  |
| 3 |  | ● |  |  |  | ○↔○ |  |
| 4 |  |  |  |  | ● | ○↔○ |  |
| 5 | ● |  |  |  |  | ○ | ● |
| 6 |  | ● |  |  |  |  | ○ |

Figure 39:
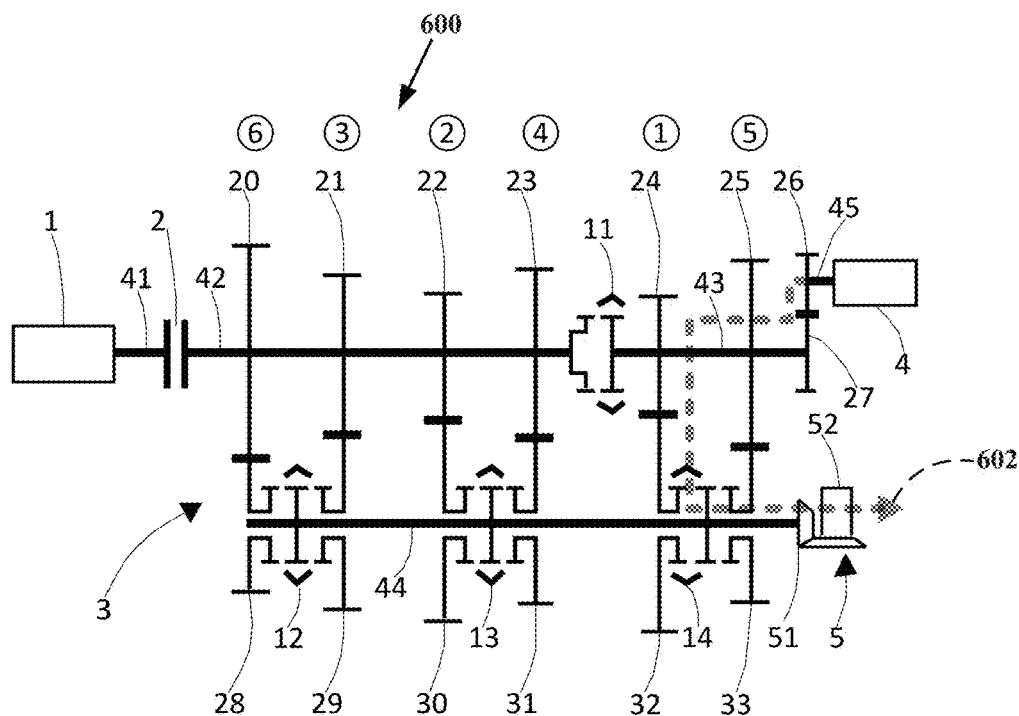
FIGS. 39-52 illustrate torque pathways through the hybrid drive system of FIG. 38 when operating in various gears, starting the internal combustion engine, and generating electricity with the electric motor.
Figure 40:
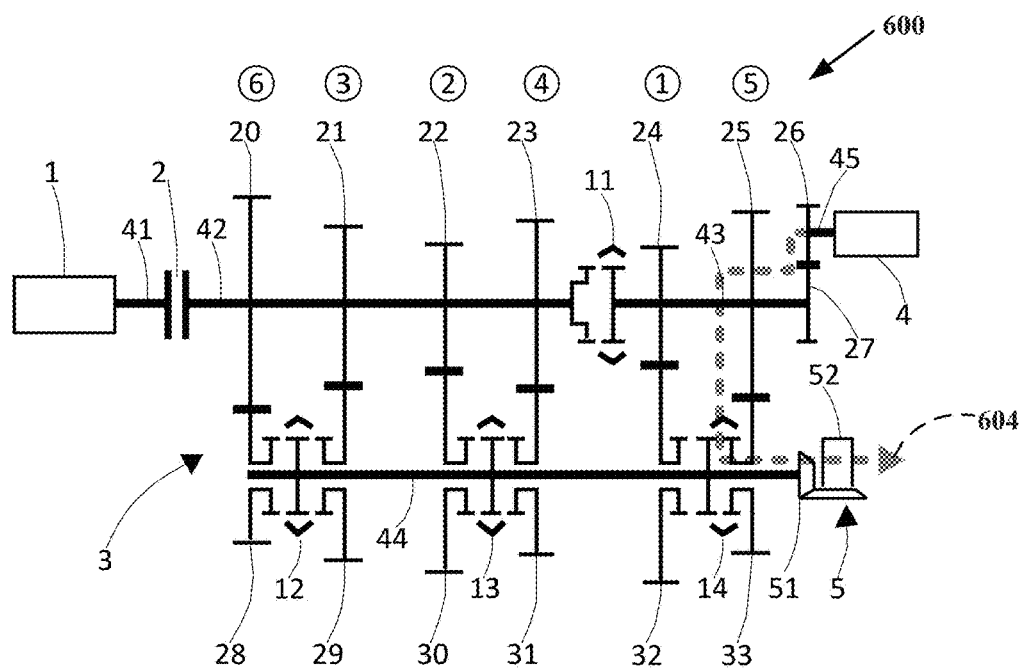
Figure 41:
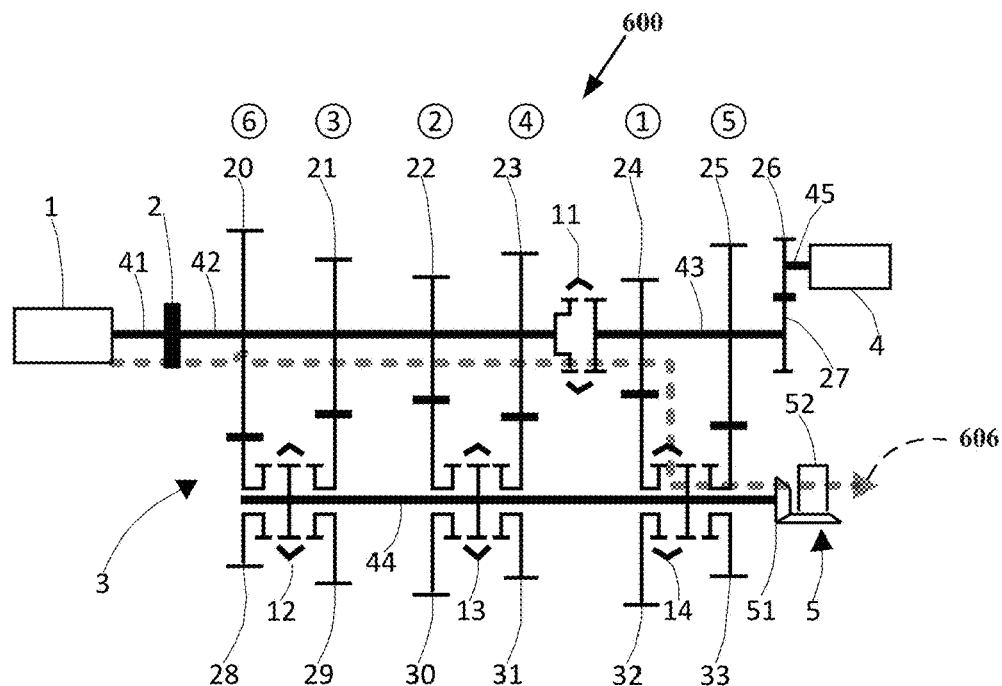
Figure 42:
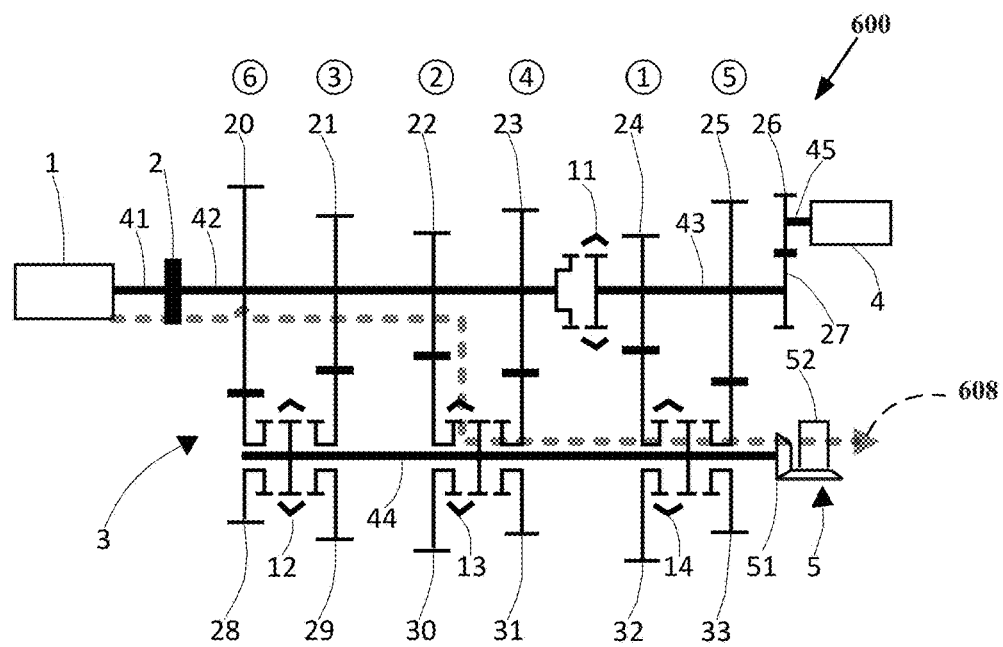
Figure 43:
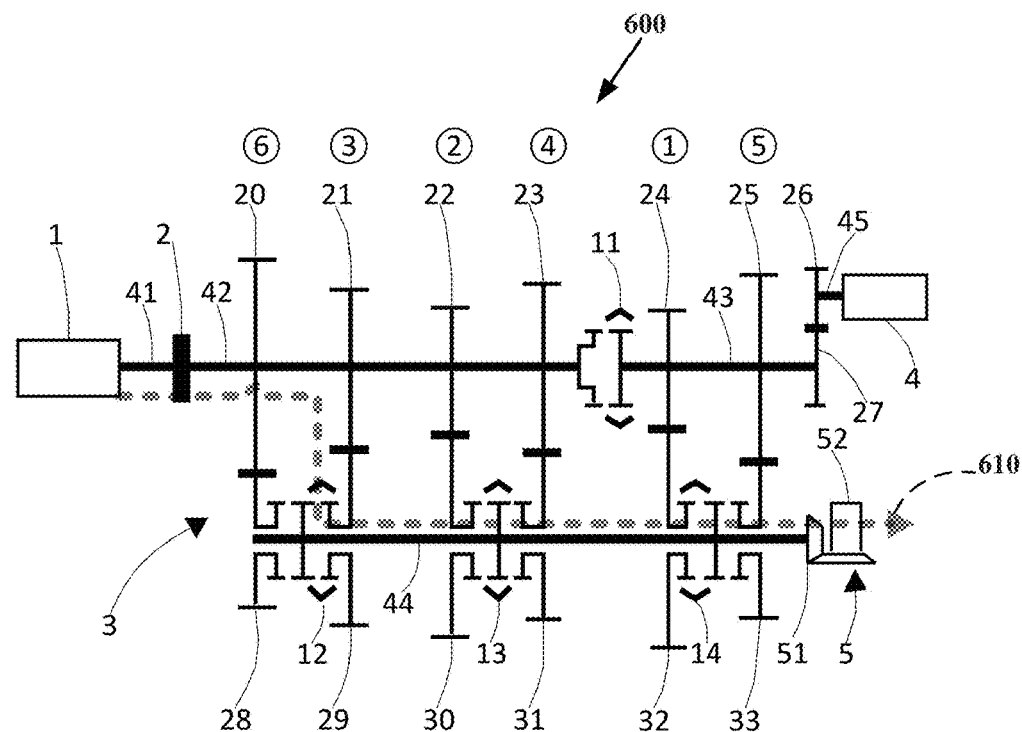
Figure 44:
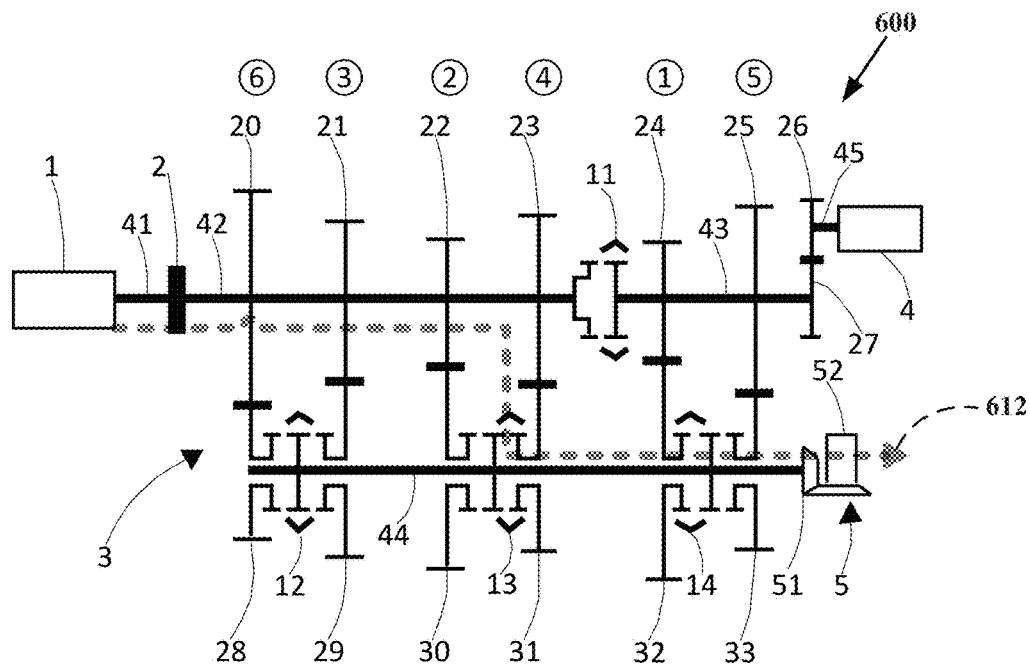
Figure 45:
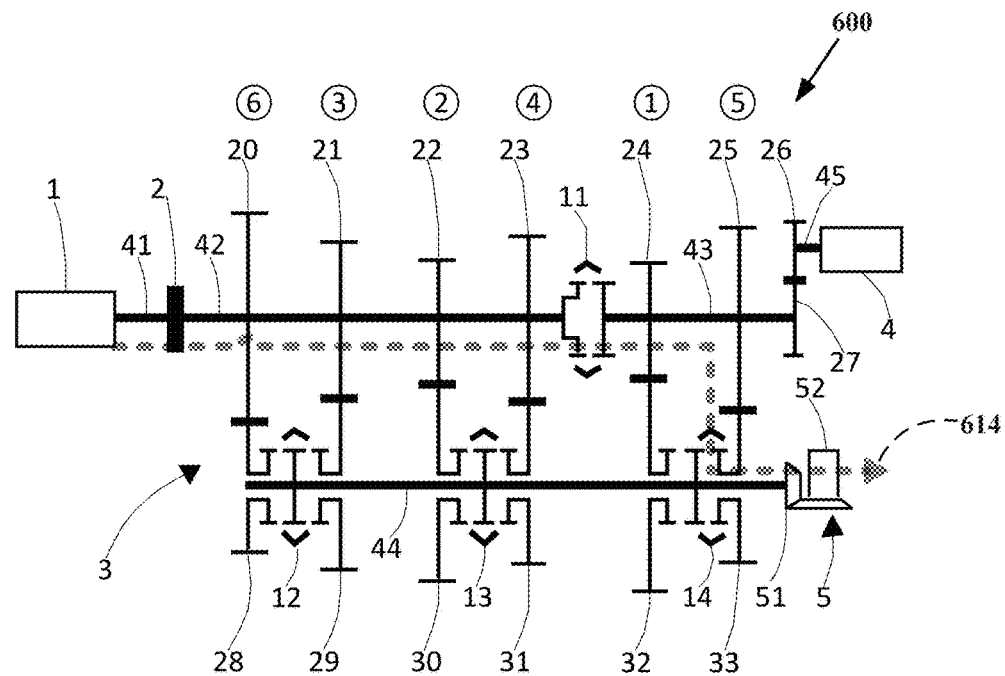
Figure 46:
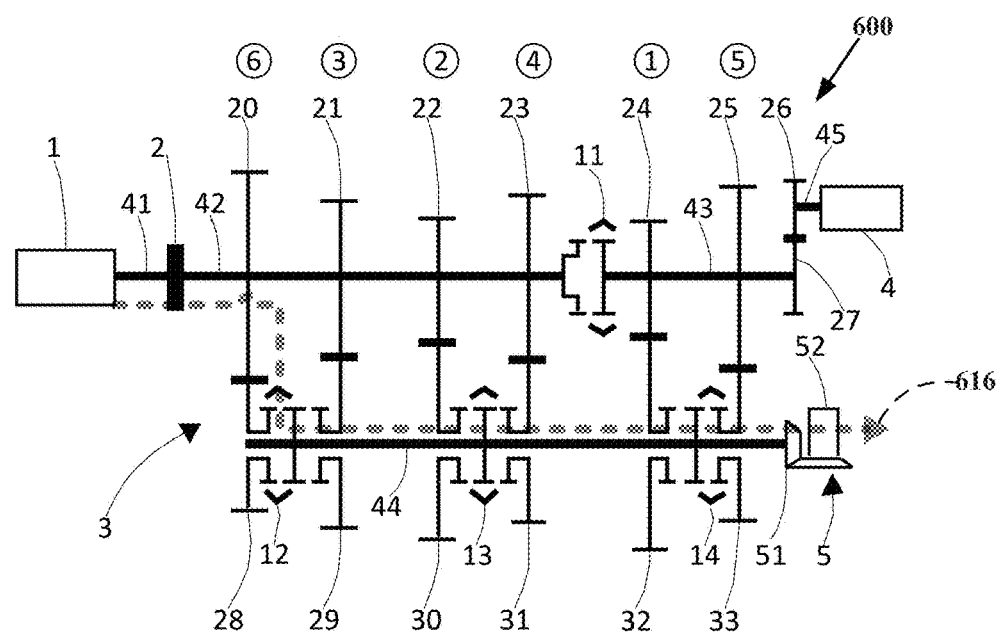

FIG. 39 illustrates the torque pathway through the hybrid drive system 600, indicated by arrow 602, for torque provided by the electric motor 4 when operating in EV mode at low speed. FIG. 40 illustrates the torque pathway through the hybrid drive system 600, indicated by arrow 604, for torque provided by the electric motor 4 when operating in EV mode at high speed. FIG. 41 illustrates the torque pathway through the hybrid drive system 600, indicated by arrow 606, for torque provided by the internal combustion engine 1 when operating in first gear. FIG. 42 illustrates the torque pathway through the hybrid drive system 600, indicated by arrow 608, for torque provided by the internal combustion engine 1 when operating in second gear. FIG. 43 illustrates the torque pathway through the hybrid drive system 600, indicated by arrow 610, for torque provided by the internal combustion engine 1 when operating in third gear. FIG. 44 illustrates the torque pathway through the hybrid drive system 600, indicated by arrow 612, for torque provided by the internal combustion engine 1 when operating in fourth gear. FIG. 45 illustrates the torque pathway through the hybrid drive system 600, indicated by arrow 614, for torque provided by the internal combustion engine 1 when operating in fifth gear. FIG. 46 illustrates the torque pathway through the hybrid drive system 600, indicated by arrow 616, for torque provided by the internal combustion engine 1 when operating in sixth gear.

Figure 47:
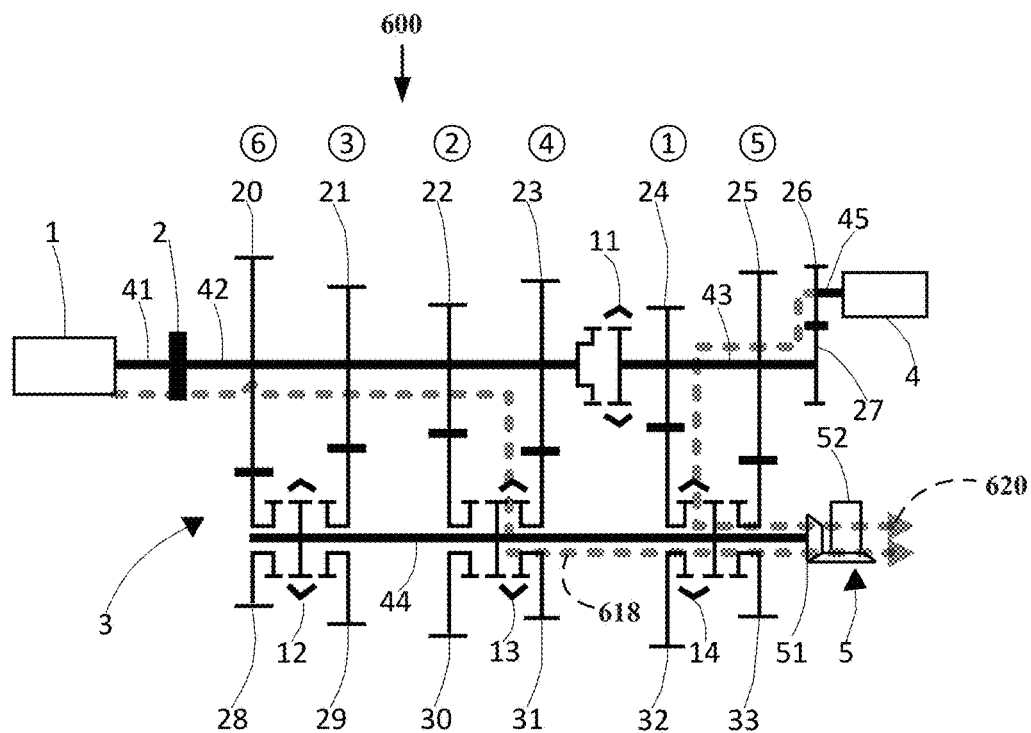
Figure 48:
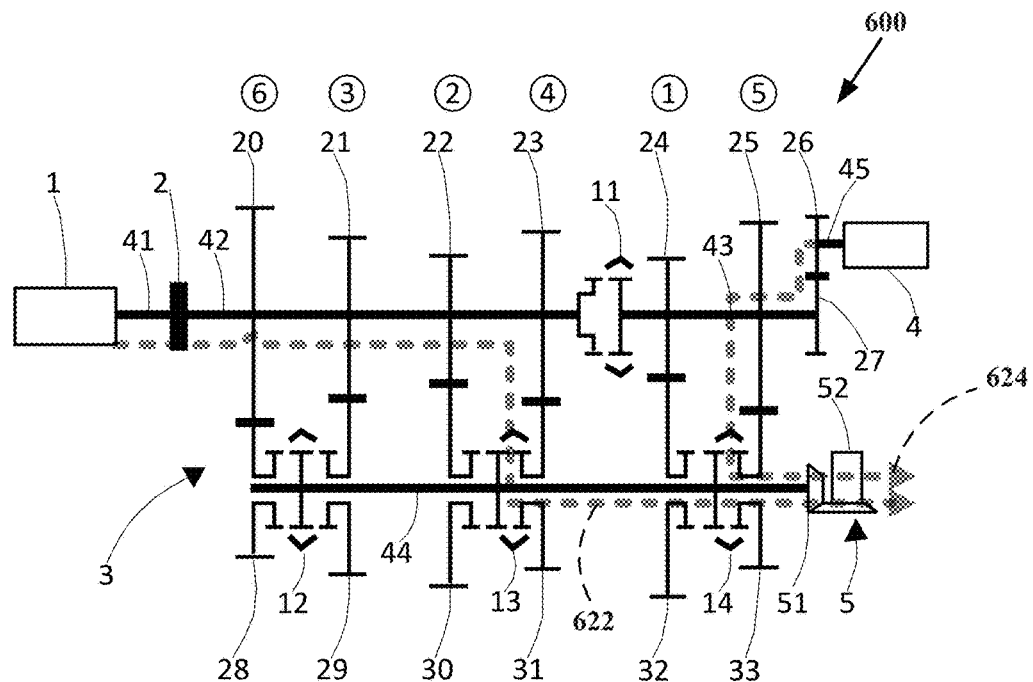
Figure 49:
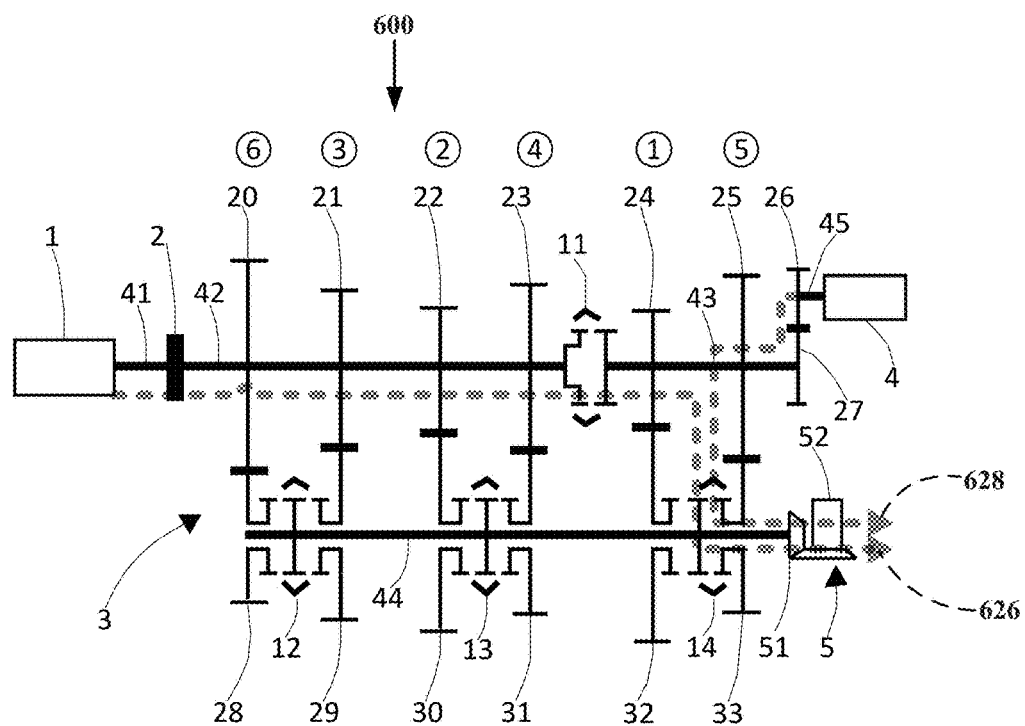

FIG. 47 illustrates the torque pathway through the hybrid drive system 600 for torque provided by the internal combustion engine 1, indicated by arrow 618, and for torque provided by the electric motor 4, indicated by arrow 620, when disengaging between fourth and fifth gears. FIG. 48 illustrates the torque pathway through the hybrid drive system 600 for torque provided by the internal combustion engine 1, indicated by arrow 622, and for torque provided by the electric motor 4, indicated by arrow 624, when the electric motor 4 is transmitting torque to output shaft 44 via gearwheel 43. FIG. 49 illustrates the torque pathway through the hybrid drive system 600 for torque provided by the internal combustion engine 1, indicated by arrow 626, and for torque provided by the electric motor 4, indicated by arrow 628, after shifting into fifth gear.

Figure 50:
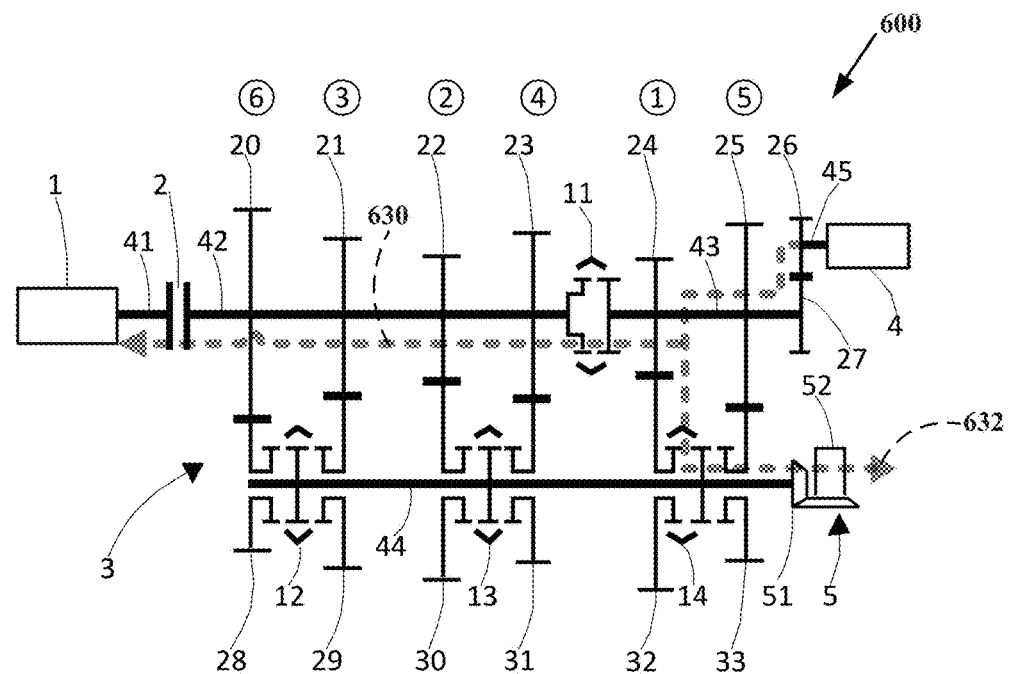
Figure 51:
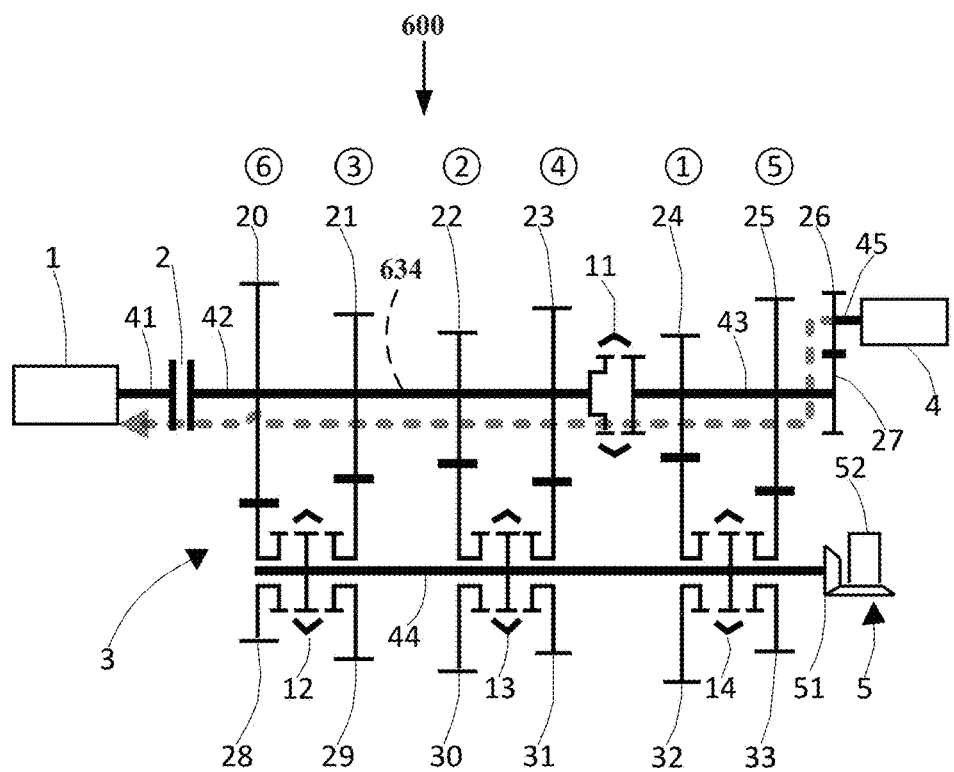
Figure 52:
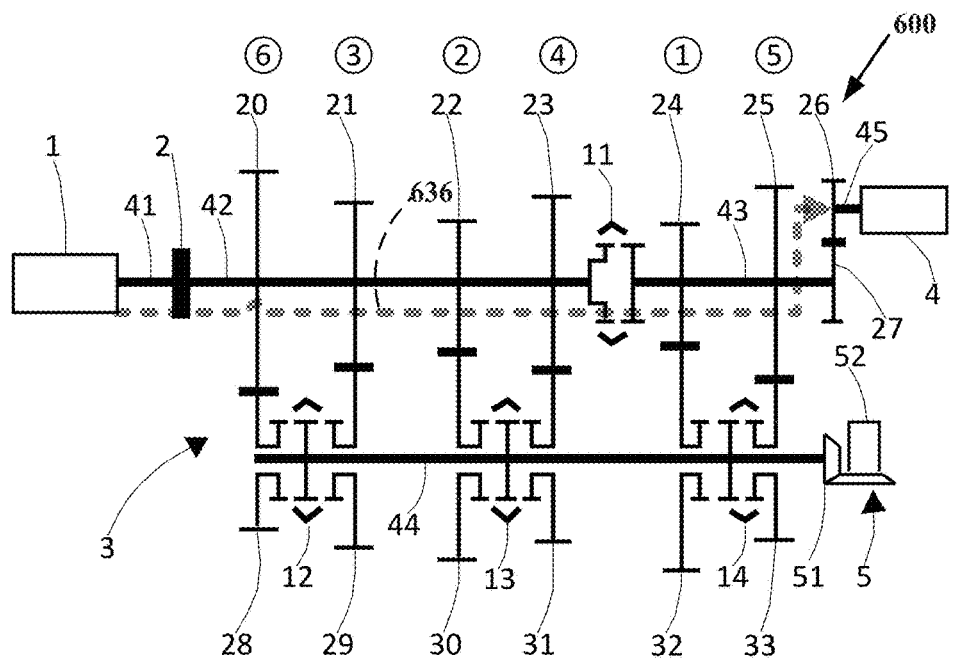

FIG. 50 illustrates the torque pathway through the hybrid drive system 600 for torque provided by the electric motor 4 to the internal combustion engine 1, indicated by arrow 630, and to the output shaft 44, indicated by arrow 632, in a first method of starting the internal combustion engine 1. FIG. 51 illustrates the torque pathway through the hybrid drive system 600 for torque provided by the electric motor 4, indicated by arrow 634, in a second method of starting the internal combustion engine 1. FIG. 52 illustrates the torque pathway through the hybrid drive system 600 for torque provided by the internal combustion engine 1 to the electric motor 4, indicated by arrow 636, when using the electric motor 4 to generate electricity.

Figure 53:
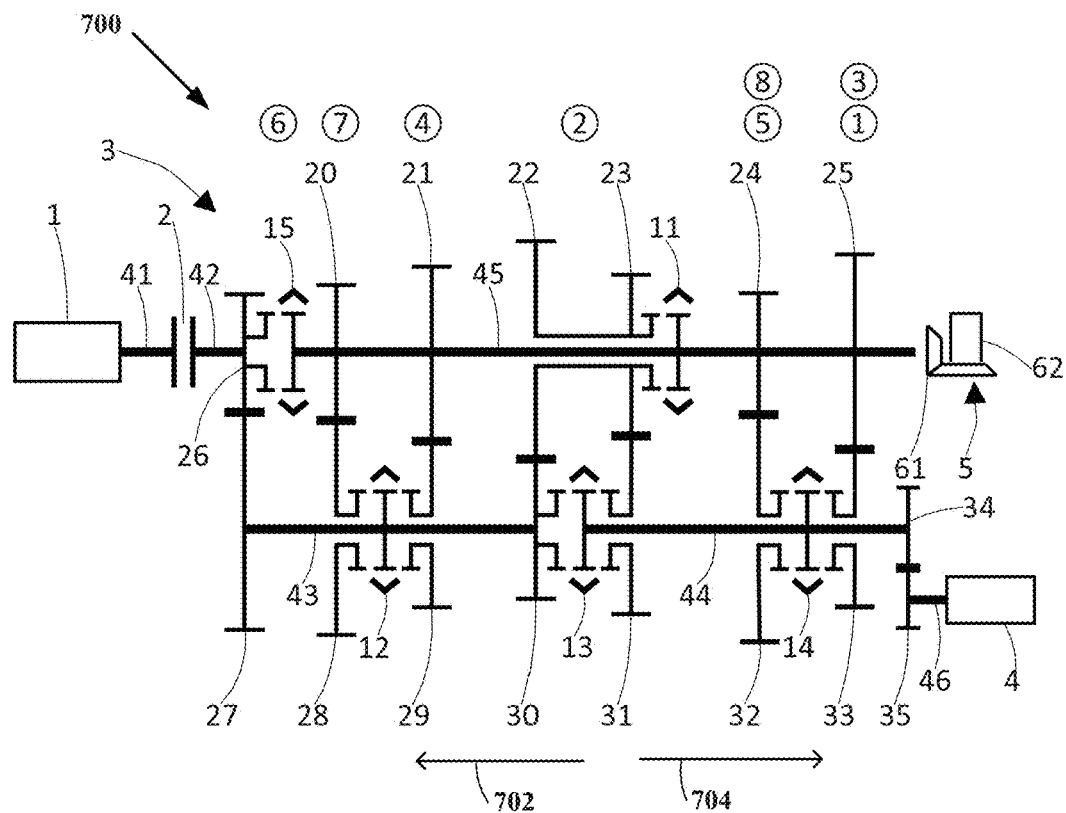
FIG. 53 illustrates another embodiment of a hybrid drive system including an internal combustion engine and an electric motor.

FIG. 53 illustrates another embodiment of a hybrid drive system 700. As shown in FIG. 53, the parallel shaft transmission 3 can be modified from a basic manual transmission with advantages of low costs, high efficiency and high capacity, which is critical for trucks. The input shaft 42 can be selectively coupled to the crankshaft 41 of the internal combustion engine 1 via main clutch 2, and selectively coupled to output shaft 45 via a coupling device 15, typically a dog clutch. In some embodiments, the output shaft 45 can be coaxial with input shaft 42, and can be selectively coupled to intermediate shaft 43, which can be parallel to the output shaft, via gearwheels 26 and 27. The electric motor 4 can be coupled to a second intermediate shaft 44, which can be a semi-independent shaft, and which can be coaxial with the first intermediate shaft 43.

By shifting the coupling device 13 in the direction indicated by arrow 702, the first and second intermediate shafts can be coupled together. By shifting the coupling device 13 in the direction indicated by arrow 704, the two shafts 43 and 44 can be rotationally coupled via compound gearwheels 22 and 23, which can be mounted idly on output shaft 45. The first intermediate shaft can be connected to the output shaft via three gears (i.e., gearwheel pairs 20 and 28, 21 and 29, and 22 and 30). Similarly, the output shaft can be connected to the second intermediate shaft via three additional gears (i.e., gearwheel pairs 23 and 31, 24 and 32, 25 and 33). Through the appropriate engagement and disengagement of the coupling devices, eight gears ratios can be provided for operation of the hybrid drive system 700 in parallel hybrid mode. The hybrid drive system 700 can allow a hybrid vehicle in which the hybrid drive system is incorporated to operate in parallel hybrid mode and/or EV mode.

Table 3 summarizes the position of dog clutches associated with each of the coupling devices 11, 12, 13, 14 and 15 when changing gears. With reference to Table 3, a solid circle indicates that a dog clutch of a particular coupling device is engaged such that it can transmit torque provided by the internal combustion engine 1, while a hollow circle indicates that a dog clutch associated with a particular coupling device is engaged such that it can transmit torque provided by the electric motor 4. The designations "L" and "R" in Table 3 indicate whether the respective dog clutch is positioned to the left or the right in the figures and, hence, engaged with the respective gearwheel at the left or right position.

TABLE 3

| | | Dog clutch | | | | | | | |
|---|---|---|---|---|---|---|---|---|---|
| HEV mode | Gear # | 11 | L12 | R12 | L13 | R13 | L14 | R14 | 15 |
| Parallel mode-Stepped transmission | 1 | | | | ● | | ● | ○ | |
| | 2 | ● | | | | | ● | ○ | |
| | 3 | | | ● | | | ● | ○ | |
| | 4 | | ● | | | | ○ ↔ ○ | | |
| | 5 | | | | | ● | ● | ○ | |
| | 6 | | | | | | ○ | | ● |
| | 7 | ● | | | | | ○ | | |
| | 8 | | | ● | | | ● | ○ | |

Figure 54:
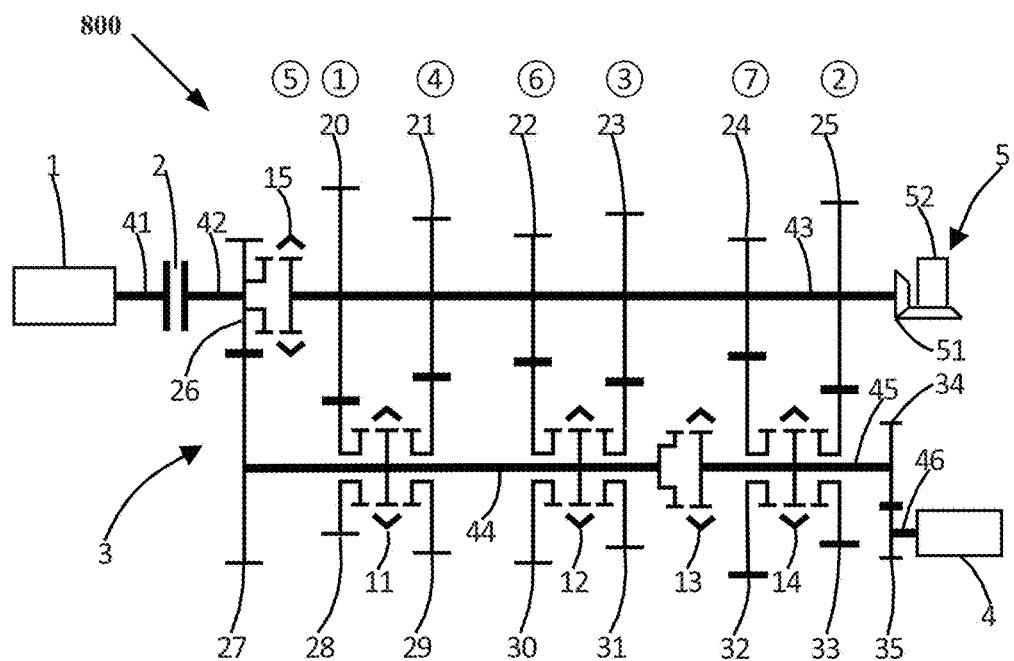
FIG. 54 illustrates another embodiment of a hybrid drive system including an internal combustion engine and an electric motor.

FIG. 54 illustrates another embodiment of a hybrid drive system 800 including an internal combustion engine 1 coupled to a main input shaft 42, and an electric motor 4 coupled to a secondary input shaft 45. The internal combustion engine 1 can be selectively coupled to the main input shaft 42 by a clutch 2, and the main input shaft 42 and an output shaft 43 can be selectively coupled together by a coupling device 15. The hybrid drive system 800 can also include an intermediate shaft 44 selectively coupled to the secondary input shaft 45 by a coupling device 13. In the embodiment shown, the secondary shaft 44 and the secondary input shaft 45 can be coupled to the main input shaft 42 and the output shaft 43 by a plurality of gearwheels and by coupling devices 11, 12, and 14. In the embodiment shown, the internal combustion engine 1 and the electric motor 4 can jointly provide motive power at varying ratios, or motive power can be provided exclusively by either the internal combustion engine or the electric motor 4. This can allow a hybrid vehicle into which the hybrid drive system 800 is incorporated to operate as a parallel hybrid or an electric vehicle, as desired.

Figure 55:
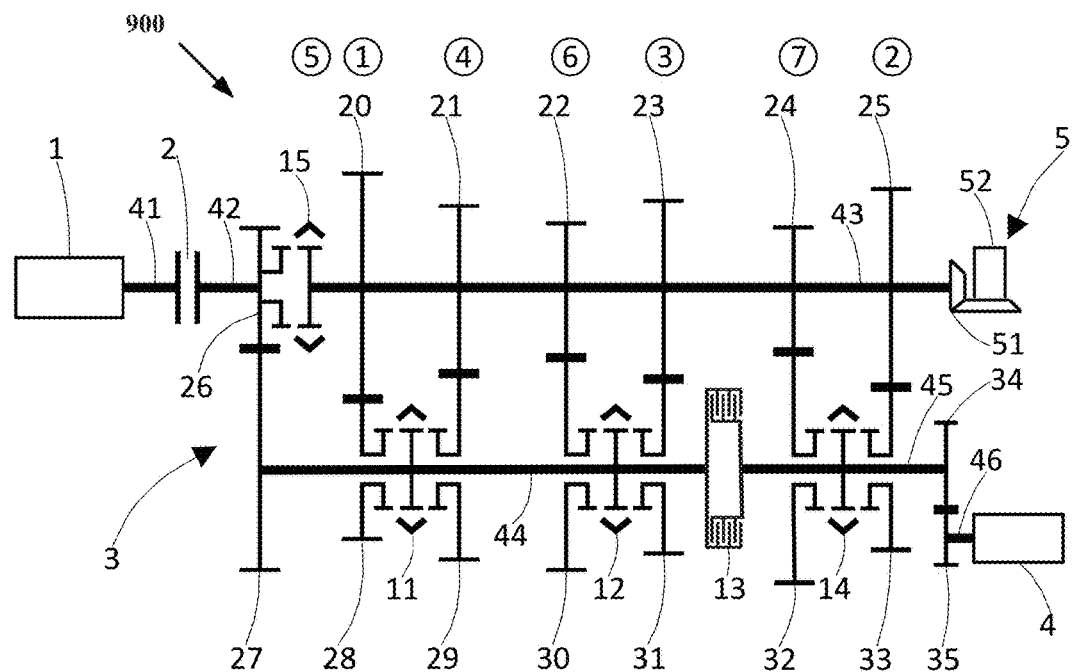
FIG. 55 illustrates another embodiment of a hybrid drive system including an internal combustion engine and an electric motor.

FIG. 55 illustrates another embodiment of a hybrid drive system 900 including an internal combustion engine 1 coupled to a main input shaft 42, and an electric motor 4 coupled to a secondary input shaft 45, similar to the embodiment of FIG. 54. The coupling device 13 can be a multi-plate wet clutch, planetary gear set with controllable brake, or other coupling devices.

Figure 56:
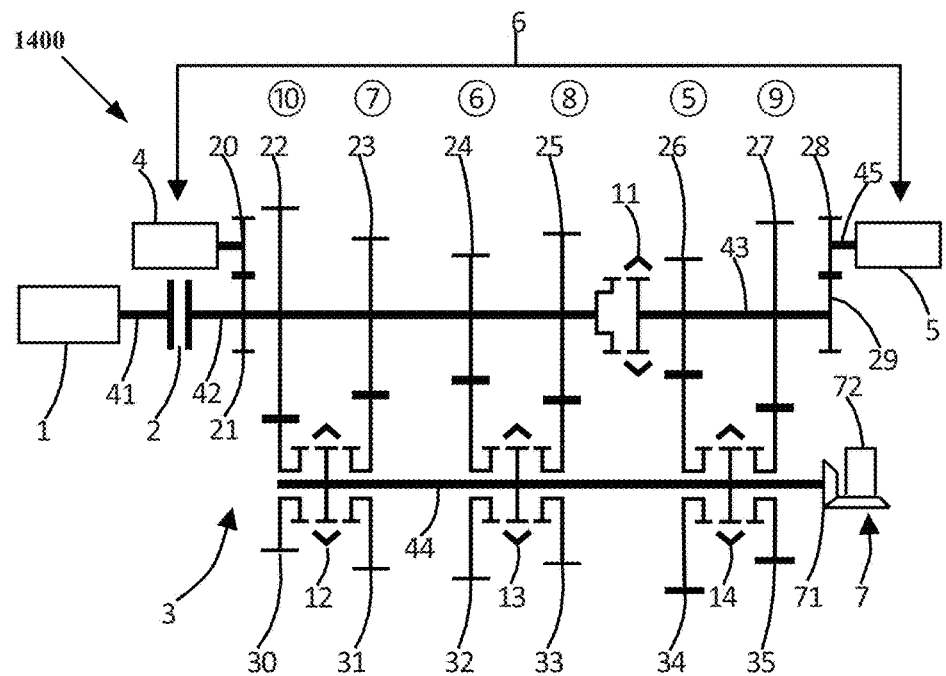
FIG. 56 illustrates another embodiment of a hybrid drive system.
Figure 57:
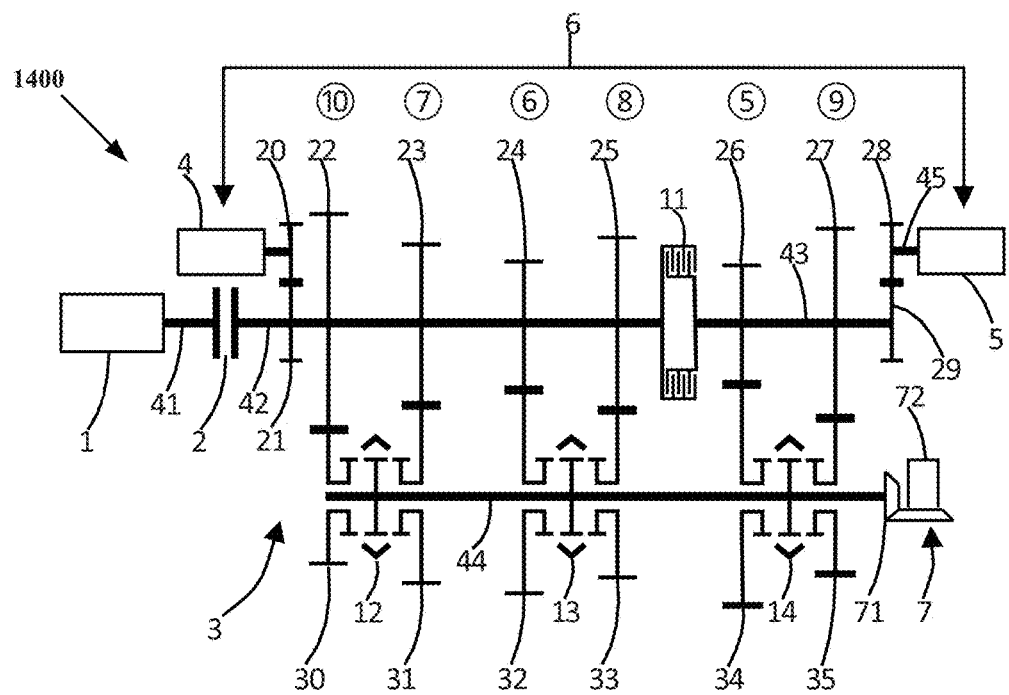
FIG. 57 illustrates another embodiment of a hybrid drive system.

FIG. 56 illustrates another embodiment of a hybrid drive system 1400 for use in hybrid vehicles. As shown in FIG. 56, a parallel shaft transmission 3 can be modified from a basic manual transmission with advantages of low costs, high efficiency and high capacity. A main input shaft 42 can be fixedly connected to an electric motor 4 via gearwheels 20 and 21, and selectively coupled to a crankshaft 41 of an internal combustion engine 1 via a main clutch 2. In some embodiments, the second input shaft can be a semi-independent shaft, and can be couplable to an electric motor 5 via gearwheels 28 and 29, and to the main input shaft 42 via a coupling device such as a dog clutch (FIG. 56) or a multiple plate clutch or a planetary gear set with controllable brake (FIG. 57). Both the main input shaft 42 and the secondary input shaft 43 can be coupled to the output shaft 44 via a plurality of gearwheel pairs, namely gearwheels 22 and 30, 23 and 31, 24 and 32, 25 and 33, 26 and 34, and 27 and 35. When the coupling device 11 is engaged, the main input shaft 42 and the secondary input shaft 43 can engage one another, and six stepped gears can be made available for both the internal combustion engine 1 and the two electric motors 4 and 5. When the coupling device 11 is disengaged, four gears (gearwheel pairs 22 and 30, 23 and 31, 24 and 32 and 25 and 33) can be available for the internal combustion engine 1 and the electric motor 4, with the remaining two gears (gearwheel pairs 26 and 34, and 27 and 35) available for the electric motor 5. With comparison to FIG. 38, these two embodiments have one additional electric motor and achieve more flexible operation.

Figure 58:
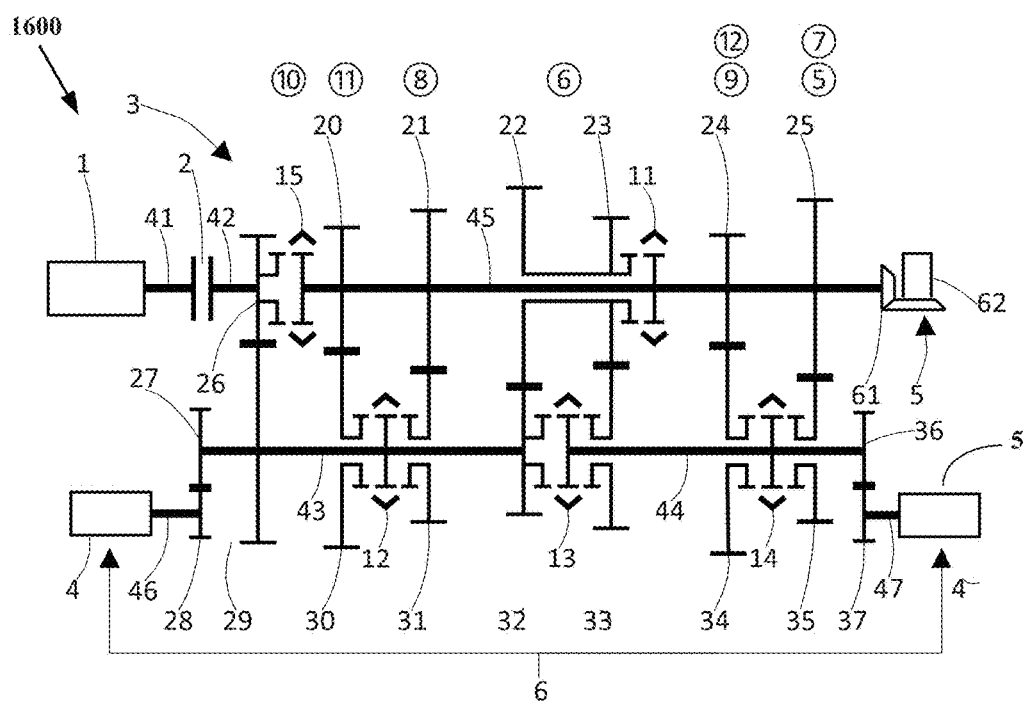
FIG. 58 illustrates another embodiment of a hybrid drive system.

FIG. 58 illustrates another embodiment of a hybrid drive system 1600. The hybrid drive system 1600 can include an irreversible drive machine and two reversible drive machines, which can all be interconnected by a hybrid transmission. The hybrid drive system 1600 can be applicable to, for example, hybrid electric vehicles (HEVs), plug-in hybrid electric vehicles (PHEVs), fuel cell hybrid electric vehicles (FCHEVs) and pure electric vehicles (EVs), as well as other applications with blended drives.

The primary components of the hybrid drive system 1600 can include a parallel shaft transmission 3, an irreversible drive machine, such as an internal combustion engine 1, and two reversible drive machines, such as electric motors 4 and 5. The shafts of the three drive machines can be interconnected by the parallel shaft transmission 3, which can include at least one main input shaft 42, two secondary input shaft 43 and 44, one output shaft 45, at least one clutch (dry or wet), as well as a plurality of gearwheel pairs.

In some embodiments, the parallel shaft transmission 3 can be an automated manual transmission with one main input shaft and a single clutch, or a dual-clutch transmission with two main input shafts and two clutches. In some embodiments, the internal combustion engine 1 can be replaced by an electric motor. In some embodiments, one or more of the reversible drive machines can be, for example, hydraulic motors.

In the embodiment shown, the electric motors 4 and 5 can be coupled to secondary input shafts 43 and 44 which, in turn, can be selectively coupled together by coupling device 13 (e.g., a dog clutch). Table 4 summarizes the position of dog clutches associated with each of the coupling devices 11, 12, 13, 14 and 15 when changing gears. With reference to Table 4, solid circles indicate that the dog clutch of a particular coupling device is engaged such that it can transmit torque provided by the internal combustion engine 1, while hollow circles indicate that the dog clutch associated with a particular coupling device is engaged such that it can transmit torque provided by the electric motor 4. The designations "L" and "R" in Table 4 indicate whether the respective dog clutch is positioned to the left or the right in the figures and, hence, engaged with the respective gearwheel at the left or right position.

TABLE 4

| HEV mode | Gear # | 11 | L12 | R12 | L13 | R13 | L14 | R14 | 15 |
|---|---|---|---|---|---|---|---|---|---|
| Series mode-eCVT | | | | | | | ○ | ● | |
| Parallel mode-Stepped transmission | 5 | | | | | ● | ○ | ● | |
| | 6 | ● | | | | | ○ | | |
| | 7 | | | | ● | | ○ | ● | |
| | 8 | | | ● | | | ○↔○ | | |
| | 9 | | | | | ● | ○ | ● | |
| | 10 | | | | | | ○ | | ● |
| | 11 | ● | | | | | ○ | | |
| | 12 | | | ● | | | ● | ○ | |

Table 5 summarizes the position of dog clutches associated with each of the coupling devices 11, 12, 13, and 14 when changing gears in EV mode. With reference to Table 5, solid circles indicate that the dog clutch of a particular coupling device is engaged such that it can transmit torque provided by the internal combustion engine 1, while hollow circles indicate that the dog clutch associated with a particular coupling device is engaged such that it can transmit torque provided by the electric motor 4. The designations "L" and "R" in Table 5 indicate whether the respective dog clutch is positioned to the left or the right in the figures and, hence, engaged with the respective gearwheel at the left or right position.

TABLE 5

| EV mode | Gear # | 11 | L12 | R12 | L13 | R13 | L14 | R14 |
|---|---|---|---|---|---|---|---|---|
| Stepped transmission | 1 | | | | | | | ○ |
| | 2 | | ○ | | | | | |
| | 3 | | | | | | ○ | |
| | 4 | | ○ | | | | | |

Figure 59:
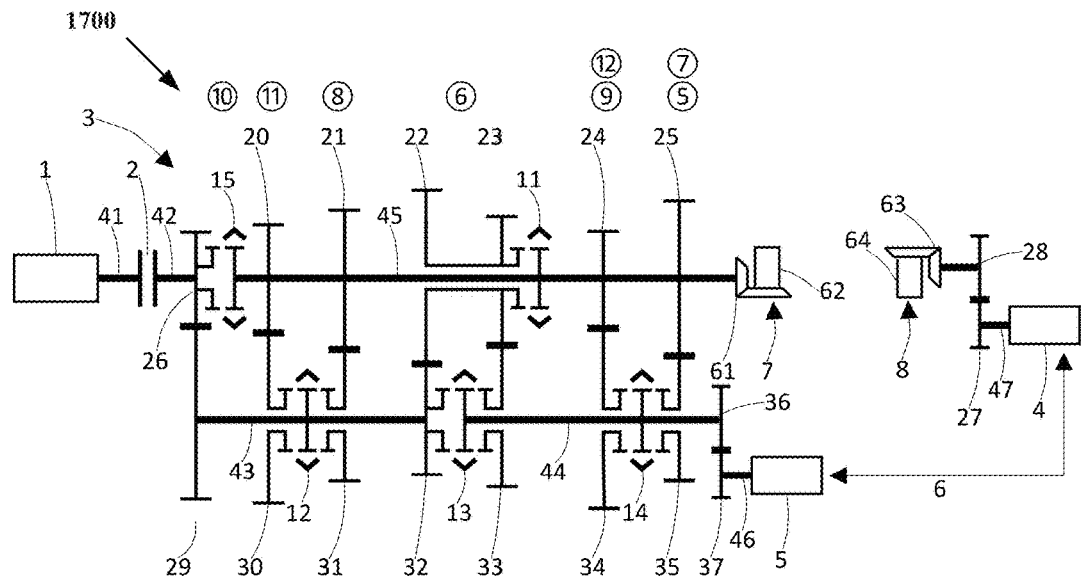
FIG. 59 illustrates another embodiment of a hybrid drive system.

FIG. 59 illustrates another embodiment of a hybrid drive system 1700 in which the electric motor 4 is not mechanically coupled to the automated manual transmission 3. Rather, the electric motor 4 can be mechanically coupled to a second final drive 8, and can be electrically connected with the electric motor 5. In this manner, electrical energy generated by the electric motor 5 (e.g., via torque input from the internal combustion engine 1) can be provided to the electric motor 4, which can propel the vehicle in combination with, or in lieu of, torque provided by the internal combustion engine 1 and/or the electric motor 5 to final drive 7.

Figure 60:
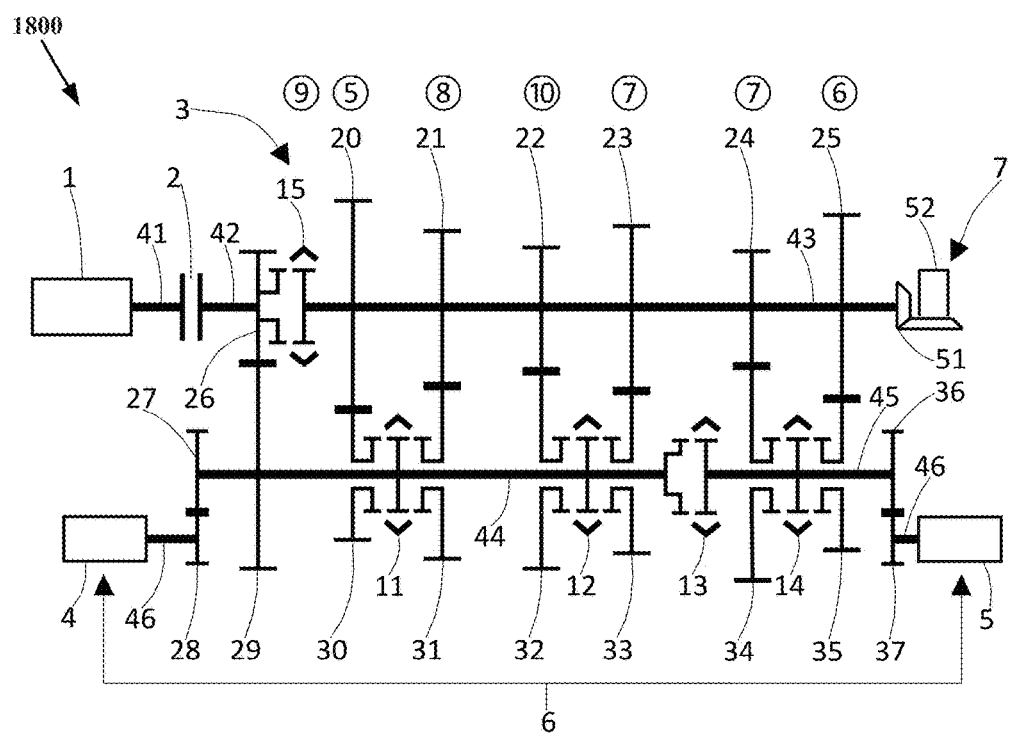
FIG. 60 illustrates another embodiment of a hybrid drive system.

FIG. 60 illustrates another embodiment of a hybrid drive system 1800 including a parallel shaft, automated manual transmission 3, an internal combustion engine 1, and two electric motors 4 and 5. The electric motors 4, 5 can be mounted to secondary input shafts 44, 45, respectively, which can be selectively coupled via coupling device 13. The hybrid drive system 1800 can also include a main input shaft 42 coupled to the internal combustion engine 1. The main input shaft can be selectively coupled to an output shaft 43 by coupling device 15. The main input shaft 42, output shaft 43, and secondary input shafts 44, 45 can be selectively coupled together in various gear ratio combinations by a plurality of gearwheel pairs. In this manner, a vehicle into which the hybrid drive system 1800 is incorporated can operate in series hybrid mode, parallel hybrid mode, or in EV mode.

Figure 61:
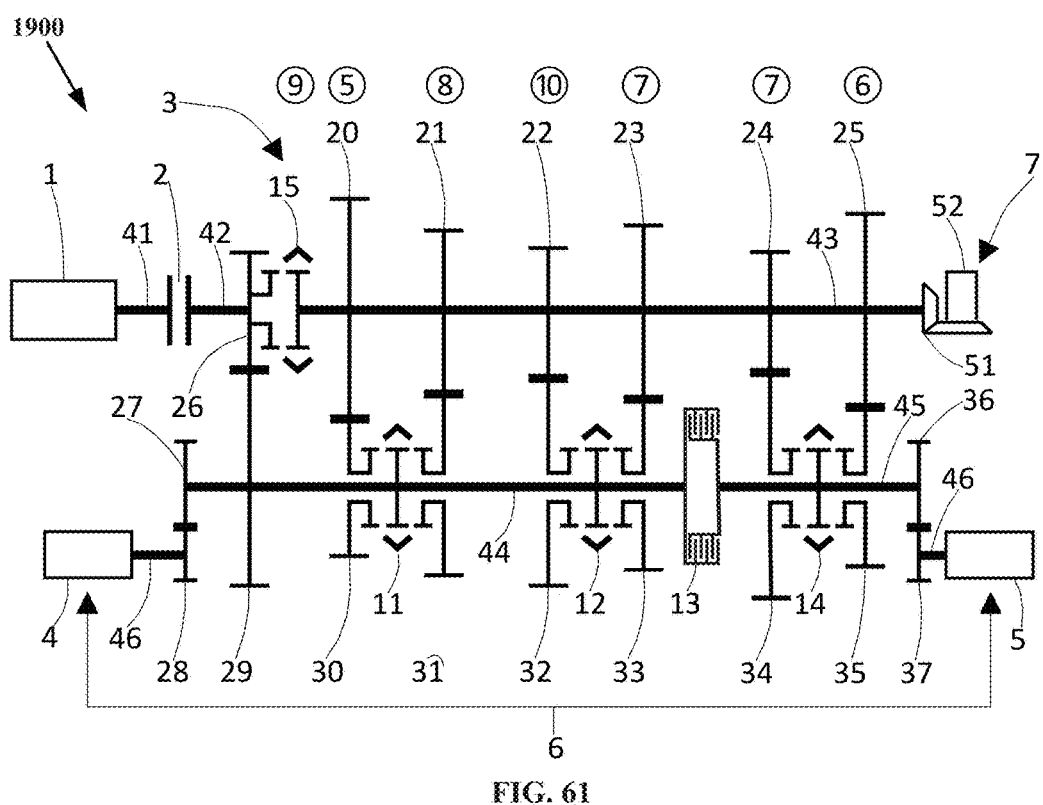
FIG. 61 illustrates another embodiment of a hybrid drive system.

FIG. 61 illustrates another embodiment of a hybrid drive system 1900 similar to the embodiment of FIG. 60, wherein the coupling device 13 between secondary input shafts 44 and 45 is a multiple plate clutch.

In view of the many possible embodiments to which the principles of the disclosure may be applied, it should be recognized that the illustrated embodiments are only preferred examples and should not be taken as limiting the scope of the disclosure. Rather, the scope of the disclosure is defined by the following claims.

What is claimed is:

1. A hybrid drive system for a vehicle, comprising:
   a transmission having a first input shaft coupled to an output shaft and coupled to a second input shaft, the output shaft and the second input shaft being coaxial, the first input shaft and the output shaft being coupled by a plurality of shiftable gearwheel pairs and a shiftable compound gearwheel, the compound gearwheel being idly mounted on the first input shaft and engaged with a gearwheel on the second input shaft and engaged with a shiftable gearwheel idly mounted on the output shaft;
   at least one irreversible drive machine coupled to the first input shaft;
   a first reversible drive machine coupled to the second input shaft, the second input shaft being selectively couplable to the first input shaft and selectively couplable to the output shaft;
   a second reversible drive machine coupled to the first input shaft; and
   an energy storage system electrically connected with the second reversible drive machine.

2. The hybrid drive system of claim 1, wherein the first input shaft is parallel to the output shaft and parallel to the second input shaft.

3. The hybrid drive system of claim 1, wherein the compound gearwheel includes two bonded gearwheels, and is synchronously rotatable with the first input shaft in response to engagement with a coupling device on the first input shaft.

4. The hybrid drive system of claim 1, further comprising a dog clutch configured to engage the second input shaft and the output shaft directly at low speed and to indirectly couple the second input shaft to the output shaft via the compound gearwheel at high speed.

5. The hybrid drive system of claim 1, wherein the compound gearwheel is mounted at an end of the first input shaft.

6. The hybrid drive system of claim 1, wherein the compound gearwheel is mounted at a center of the first input shaft.

7. The hybrid drive system of claim 1, wherein:
   the irreversible drive machine is coupled to the first input shaft via a main clutch.

8. The hybrid drive system of claim 7, wherein the main clutch is a frictional clutch selected from a dry clutch, a wet clutch, or a multiple plate clutch, an electromagnetic clutch, or any combination thereof.

9. The hybrid drive system of claim 7, wherein the irreversible drive machine is an internal combustion engine that can be started by the second reversible drive machine by engaging the main clutch.

10. The hybrid drive system of claim 1, wherein the first and second reversible drive machines are coupled to the transmission by gearwheels, belts, or chains.

11. The hybrid drive system of claim 1, wherein the output shaft is rotatable in a reverse direction in response to reversal of the rotation of at least one of the reversible drive machines.

12. The hybrid drive system of claim 1, wherein the transmission is configured as an automated manual transmission.

13. The hybrid drive system of claim 1, wherein at least one of the first reversible drive machine and the second reversible drive machine is an electric motor.

14. The hybrid drive system of claim 1, wherein:
   the output shaft comprises a first gearwheel idly mounted to the output shaft, a second gearwheel idly mounted to the output shaft, and a third gearwheel idly mounted to the output shaft; and
   the first gearwheel of the output shaft engages the compound gearwheel of the first input shaft; and
   the second gearwheel and the third gearwheel of the output shaft are selectively engageable with the output shaft by a dog clutch mounted to the output shaft between the second and third gearwheels.

15. A method of operating a hybrid drive system for a vehicle, comprising:
   transmitting torque provided by an irreversible drive machine coupled to a first input shaft of a transmission along the first input shaft to an output shaft of the transmission, the first input shaft being coupled to the output shaft by a plurality of shiftable gearwheel pairs and a shiftable compound gearwheel idly mounted on the first input shaft, the transmission further comprising a second input shaft parallel to the first input shaft and selectively couplable to the first input shaft via a plurality of gearwheels operable to vary the rotational speed of the second input shaft relative to the first input shaft, the second input shaft being selectively couplable to the output shaft and coaxial with the output shaft, the compound gearwheel on the first input shaft being engaged with a gearwheel on the second input shaft and engaged with a shiftable gearwheel idly mounted on the output shaft, the transmission further comprising a first reversible drive machine coupled to the second input shaft and a second reversible drive machine coupled to the first input shaft, the transmission further comprising an energy storage system electrically connected with the second reversible drive machine;
   transmitting torque provided by the first reversible drive machine to the output shaft;
   decreasing the torque provided to the output shaft by the irreversible drive machine;
   increasing the torque provided to the output shaft by the first reversible drive machine;
   changing a gear ratio by which the irreversible drive machine transmits torque to the output shaft; and
   increasing the torque provided to the output shaft by the irreversible drive machine, wherein the total torque provided to the output shaft before, during, and after changing of the gear ratio is substantially constant.

16. The method of claim 15, further comprising operating the hybrid drive system in an electric vehicle mode.

17. The method of claim 15, where:
   the hybrid drive system includes at least two torque pathways from the second input shaft to the output shaft for the first reversible drive machine; and
   the hybrid drive system further comprises at least two torque pathways including shiftable gearwheel pairs between the first input shaft and the output shaft for the second reversible drive machine.

18. The method of claim 15, further comprising operating the first reversible drive machine and the second reversible drive machine as a continuously variable transmission.

19. The method of claim 15, further comprising operating the hybrid drive system in a series hybrid mode or in a parallel hybrid mode.

20. A hybrid drive system for a vehicle, comprising:
- a transmission having a first input shaft coupled to an output shaft and coupled to a second input shaft, the output shaft and the second input shaft being coaxial, the first input shaft and the output shaft being coupled by a plurality of shiftable gearwheel pairs and a shiftable compound gearwheel, the compound gearwheel being idly mounted on the first input shaft and engaged with a gearwheel on the second input shaft and engaged with a shiftable gearwheel idly mounted on the output shaft;
- at least one irreversible drive machine coupled to the first input shaft;
- a first reversible drive machine coupled to the second input shaft, the second input shaft being selectively couplable to the first input shaft and selectively couplable to the output shaft; and
- a second reversible drive machine coupled to the first input shaft.

\* \* \* \* \*